(12) United States Patent
Gartner et al.

(10) Patent No.: US 8,162,112 B2
(45) Date of Patent: Apr. 24, 2012

(54) METHODS AND APPARATUS FOR PROTECTING A SHOCK ABSORBER FROM BOTTOMING

(75) Inventors: Bill J. Gartner, Wyomissing, PA (US); Andrew Benjamin Lambert, Fleetwood, PA (US)

(73) Assignee: Competition Tire East, Reading, PA (US)

( * ) Notice: Subject to any disclaimer, the term of this patent is extended or adjusted under 35 U.S.C. 154(b) by 929 days.

(21) Appl. No.: 12/029,112

(22) Filed: Feb. 11, 2008

(65) Prior Publication Data
US 2008/0203631 A1  Aug. 28, 2008

Related U.S. Application Data

(60) Provisional application No. 60/889,050, filed on Feb. 9, 2007.

(51) Int. Cl.
*F16F 9/48* (2006.01)
*F16F 9/44* (2006.01)

(52) U.S. Cl. ........ 188/285; 188/288; 188/289; 188/313; 188/317; 188/319.2

(58) Field of Classification Search ............... 188/284, 188/285, 288, 289, 313, 316, 317, 319.1, 188/319.2; 16/51, 52, 56; 89/42.01, 43.01
See application file for complete search history.

(56) References Cited

U.S. PATENT DOCUMENTS

| | | | |
|---|---|---|---|
| 1,037,052 A | 8/1912 | Rennie | |
| 1,195,028 A | 8/1916 | Joyce | |
| 1,282,712 A | 10/1918 | Barrell | |
| 1,331,564 A | 2/1920 | Gruss | |
| 1,445,414 A | 2/1923 | Schuessler | |
| 1,445,615 A | 2/1923 | Ferres | |
| 1,459,365 A | 6/1923 | Dains | |
| 1,780,531 A | 11/1930 | Messier | |
| 1,957,308 A * | 5/1934 | Anderson | 188/289 |
| 2,088,875 A | 8/1937 | Serste | |
| 2,224,306 A | 12/1940 | Krueger | |
| 2,440,353 A | 4/1948 | Wallace | |
| 2,599,477 A | 6/1952 | Patriquin | |
| 2,649,937 A | 8/1953 | Crabtree | |
| 2,649,938 A | 8/1953 | Crabtree | |
| 2,671,536 A | 3/1954 | Jurasevich | |
| 2,713,401 A | 7/1955 | Serste et al. | |
| 2,721,074 A | 10/1955 | Bourcier de Carbon | |
| 2,729,308 A | 1/1956 | Koski et al. | |

(Continued)

FOREIGN PATENT DOCUMENTS
DE  19829765 A1 *  2/1999
(Continued)

OTHER PUBLICATIONS
EPO machine translation of DE 19829765A1, published Feb. 1999.*

*Primary Examiner* — Thomas J Williams
(74) *Attorney, Agent, or Firm* — John V. Daniluck; Bingham Greenebaum Doll LLP

(57) ABSTRACT

Methods and apparatus for accommodating vehicle suspensions that may bottom out. Some embodiments of the present invention include the secondary shock absorber placed within a primary shock absorber. Yet clear embodiments describe a shock absorber having multiple fluid flowpaths during compression, with one of the flowpaths being active near the bottoming-out condition.

60 Claims, 19 Drawing Sheets

U.S. PATENT DOCUMENTS

| | | |
|---|---|---|
| 2,740,500 A | 4/1956 | Brundrett et al. |
| 2,780,321 A | 2/1957 | Sturari |
| 2,825,427 A | 3/1958 | Steibel |
| 2,879,987 A | 3/1959 | Cussons |
| 3,079,629 A * | 3/1963 | Millard et al. ............ 188/289 |
| 3,134,460 A | 5/1964 | Bourcier de Carbon |
| 3,147,826 A | 9/1964 | McHenry |
| 3,175,645 A | 3/1965 | Schafer et al. |
| 3,447,644 A * | 6/1969 | Duckett .................... 188/288 |
| 3,698,284 A | 10/1972 | Toering et al. |
| 3,848,710 A | 11/1974 | Thompson et al. |
| 3,882,977 A | 5/1975 | Watanabe |
| 3,887,224 A | 6/1975 | Browne |
| 3,888,436 A | 6/1975 | Sealey |
| 3,972,551 A | 8/1976 | Fannin |
| 3,990,687 A | 11/1976 | Curnutt |
| 4,054,277 A | 10/1977 | Sirven |
| 4,106,596 A | 8/1978 | Hausmann |
| 4,226,408 A | 10/1980 | Tomita et al. |
| 4,274,515 A | 6/1981 | Bourcier de Carbon |
| 4,332,460 A | 6/1982 | Costanza |
| 4,405,119 A | 9/1983 | Masclet et al. |
| 4,437,548 A | 3/1984 | Ashiba |
| 4,624,346 A | 11/1986 | Katz |
| 4,632,228 A | 12/1986 | Oster et al. |
| 4,635,766 A * | 1/1987 | Street, Jr. ................. 188/284 |
| 4,671,392 A | 6/1987 | Wossner |
| 4,732,244 A | 3/1988 | Verkuylen |
| 4,749,068 A | 6/1988 | Sirven |
| 4,785,345 A | 11/1988 | Rawls et al. |
| 4,813,519 A | 3/1989 | Matsubara et al. |
| 4,883,150 A | 11/1989 | Arai |
| 4,890,822 A | 1/1990 | Ezure et al. |
| 4,909,488 A | 3/1990 | Seibert et al. |
| 4,921,224 A | 5/1990 | Fukumura et al. |
| 4,934,749 A | 6/1990 | Folarin |
| 4,936,424 A | 6/1990 | Costa |
| 5,024,301 A | 6/1991 | Cook |
| 5,190,126 A | 3/1993 | Curnutt |
| 5,201,389 A | 4/1993 | Miller et al. |
| 5,248,014 A | 9/1993 | Ashiba |
| 5,293,971 A | 3/1994 | Kanari et al. |
| 5,351,790 A | 10/1994 | Machida |
| 5,480,011 A | 1/1996 | Nagai et al. |
| 5,570,762 A | 11/1996 | Jentsch et al. |
| 5,595,270 A | 1/1997 | Braun et al. |
| 5,597,054 A | 1/1997 | Nagai et al. |
| 5,649,692 A | 7/1997 | Gilsdorf et al. |
| 5,810,128 A | 9/1998 | Eriksson et al. |
| 5,810,130 A | 9/1998 | McCandless |
| 5,823,306 A | 10/1998 | de Molina |
| 5,911,290 A | 6/1999 | Steed |
| 5,913,391 A | 6/1999 | Jeffries et al. |
| 5,988,610 A | 11/1999 | Hiraki et al. |
| 6,029,958 A | 2/2000 | Larsson et al. |
| 6,217,010 B1 | 4/2001 | McNeely |
| 6,220,409 B1 | 4/2001 | Deferme |
| 6,234,461 B1 | 5/2001 | Bohm et al. |
| 6,286,642 B1 | 9/2001 | Yi |
| 6,296,092 B1 | 10/2001 | Marking et al. |
| 6,318,525 B1 | 11/2001 | Vignocchi et al. |
| 6,446,771 B1 | 9/2002 | Sintorn et al. |
| 6,511,085 B2 | 1/2003 | Sawai |
| 6,609,597 B1 | 8/2003 | Heideman |
| 6,672,435 B2 | 1/2004 | Lemieux |
| 6,681,906 B1 | 1/2004 | Sasse |
| 6,725,983 B2 | 4/2004 | Bell |
| 6,776,269 B1 | 8/2004 | Schel |
| 6,814,193 B2 | 11/2004 | Grundel |
| 6,978,872 B2 | 12/2005 | Turner |
| 7,032,727 B2 | 4/2006 | Vanspauwen |
| 7,156,214 B2 | 1/2007 | Pradel et al. |
| 7,172,057 B2 | 2/2007 | Gundermann et al. |
| 7,172,058 B2 | 2/2007 | Burkert et al. |
| 2002/0053493 A1 * | 5/2002 | Sintorn et al. ............ 188/313 |

FOREIGN PATENT DOCUMENTS

| | | |
|---|---|---|
| EP | 0748950 B1 | 7/1999 |
| GB | 2148449 A * | 5/1985 |
| WO | 02095260 A1 | 11/2002 |

* cited by examiner

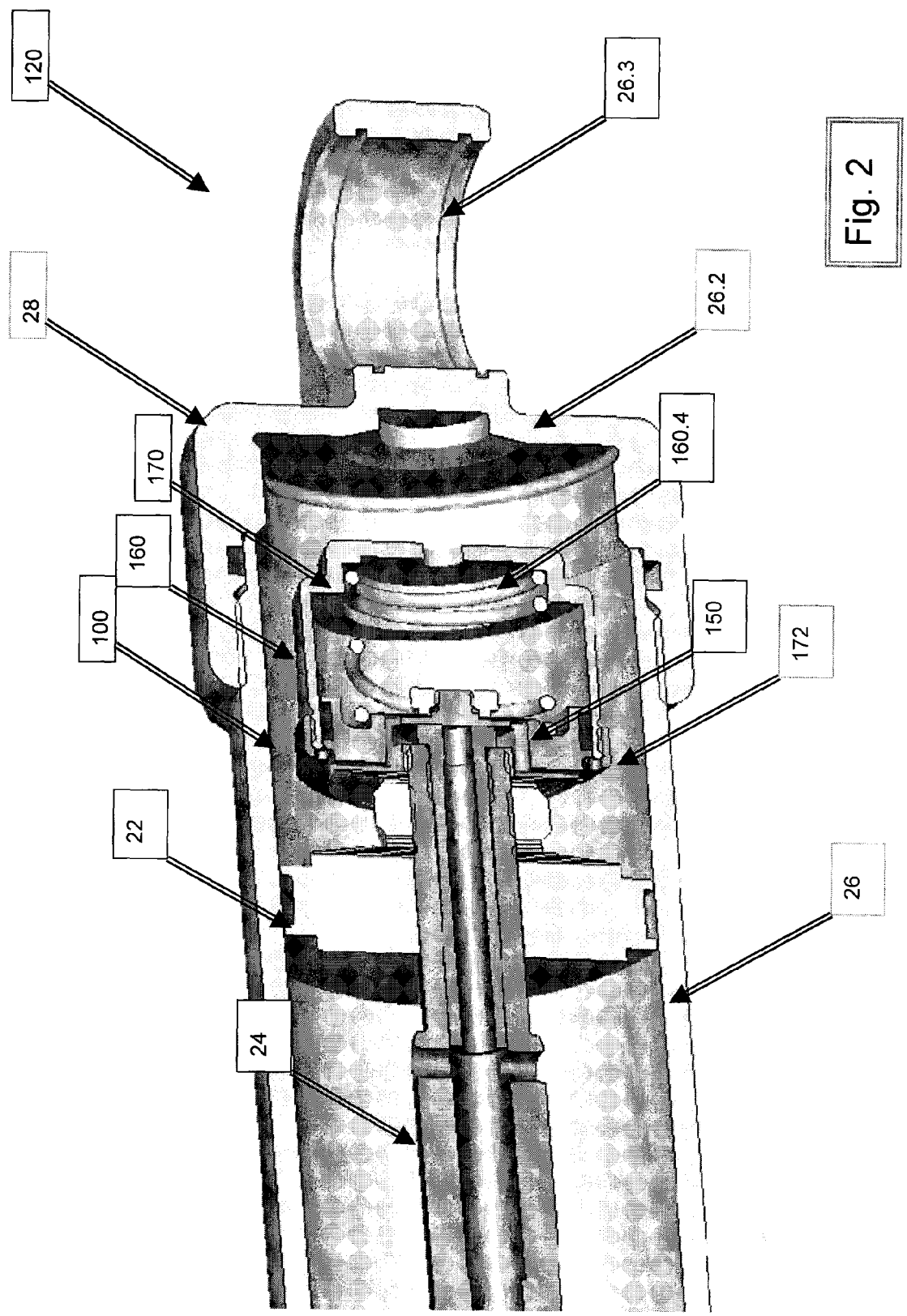

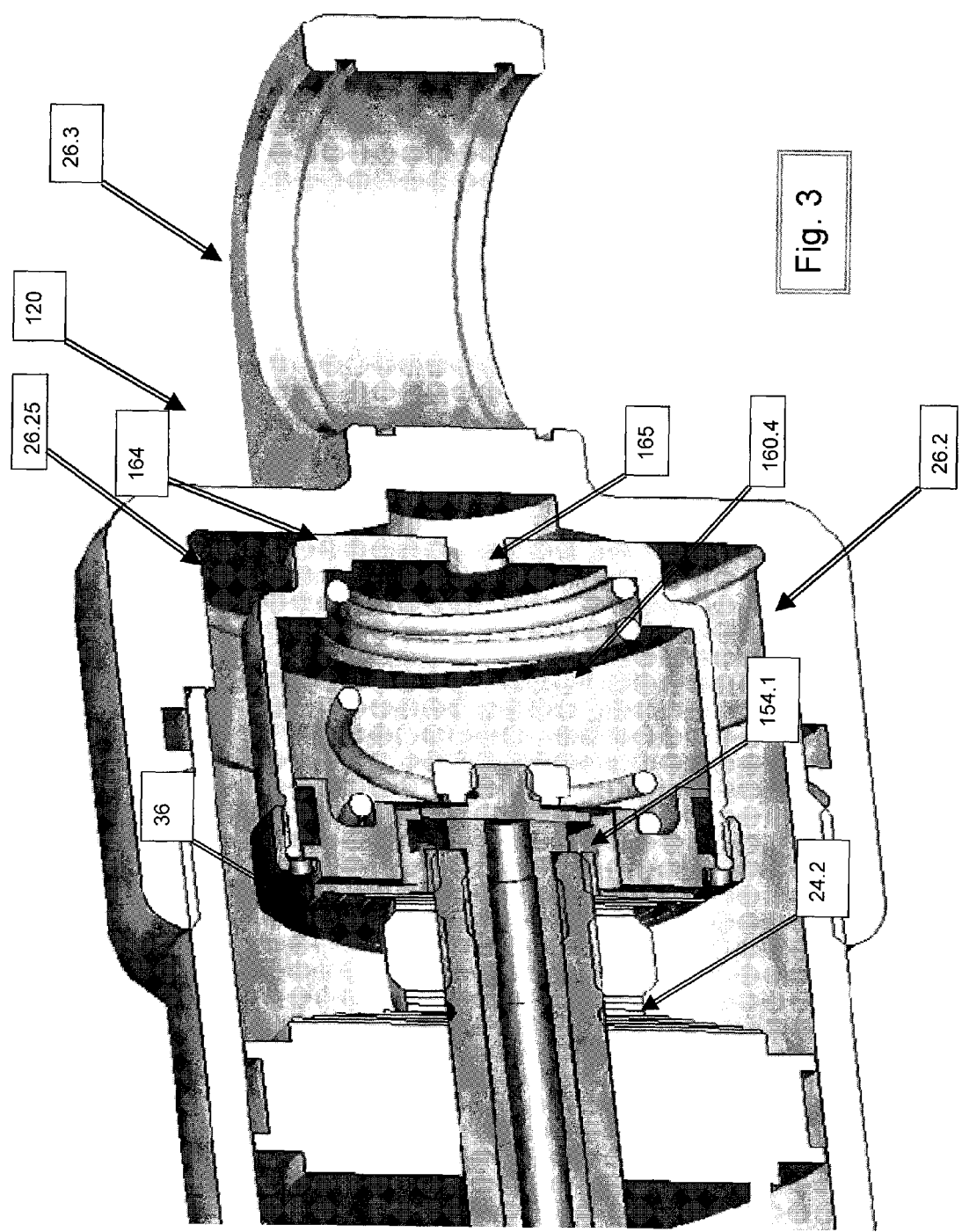

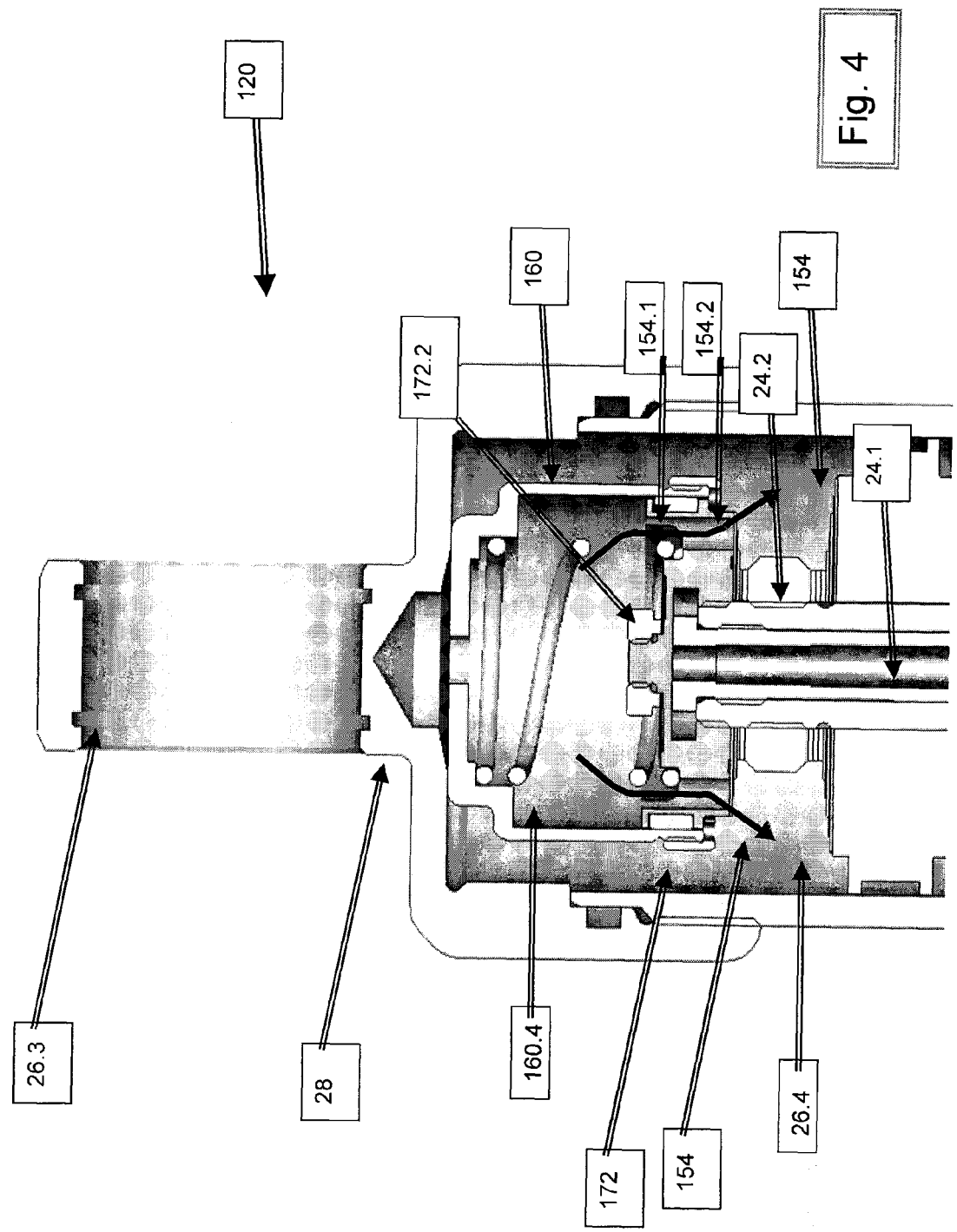

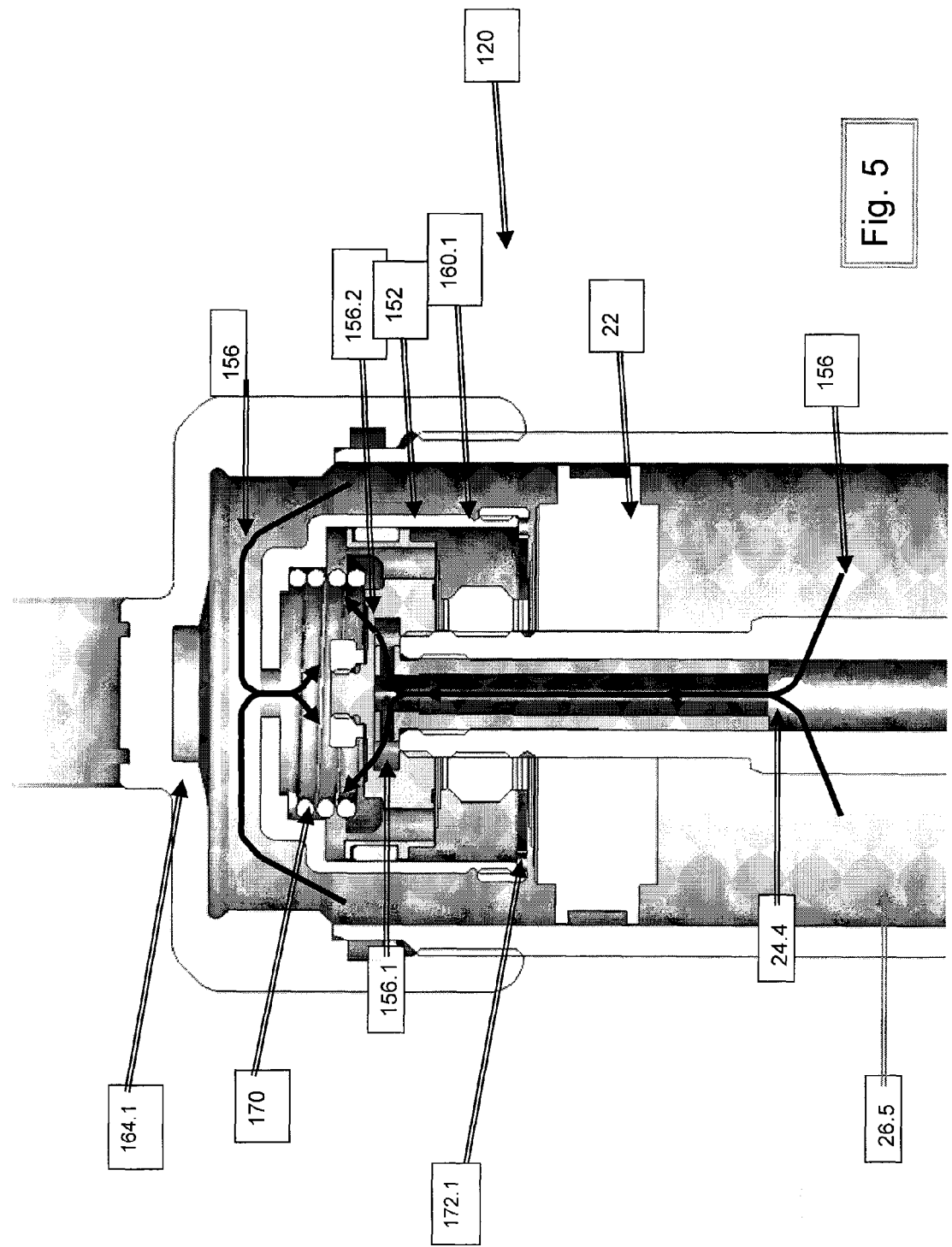

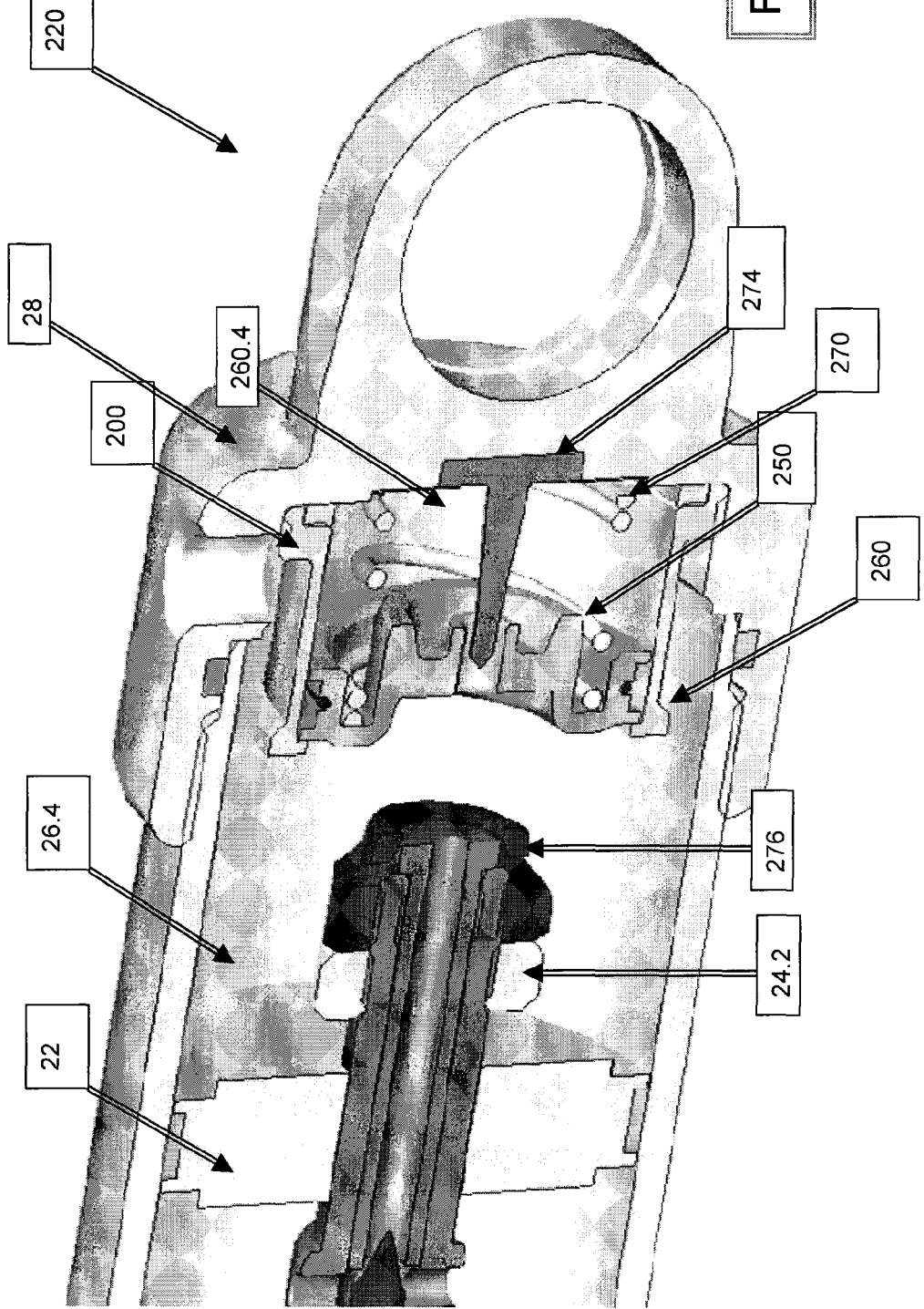

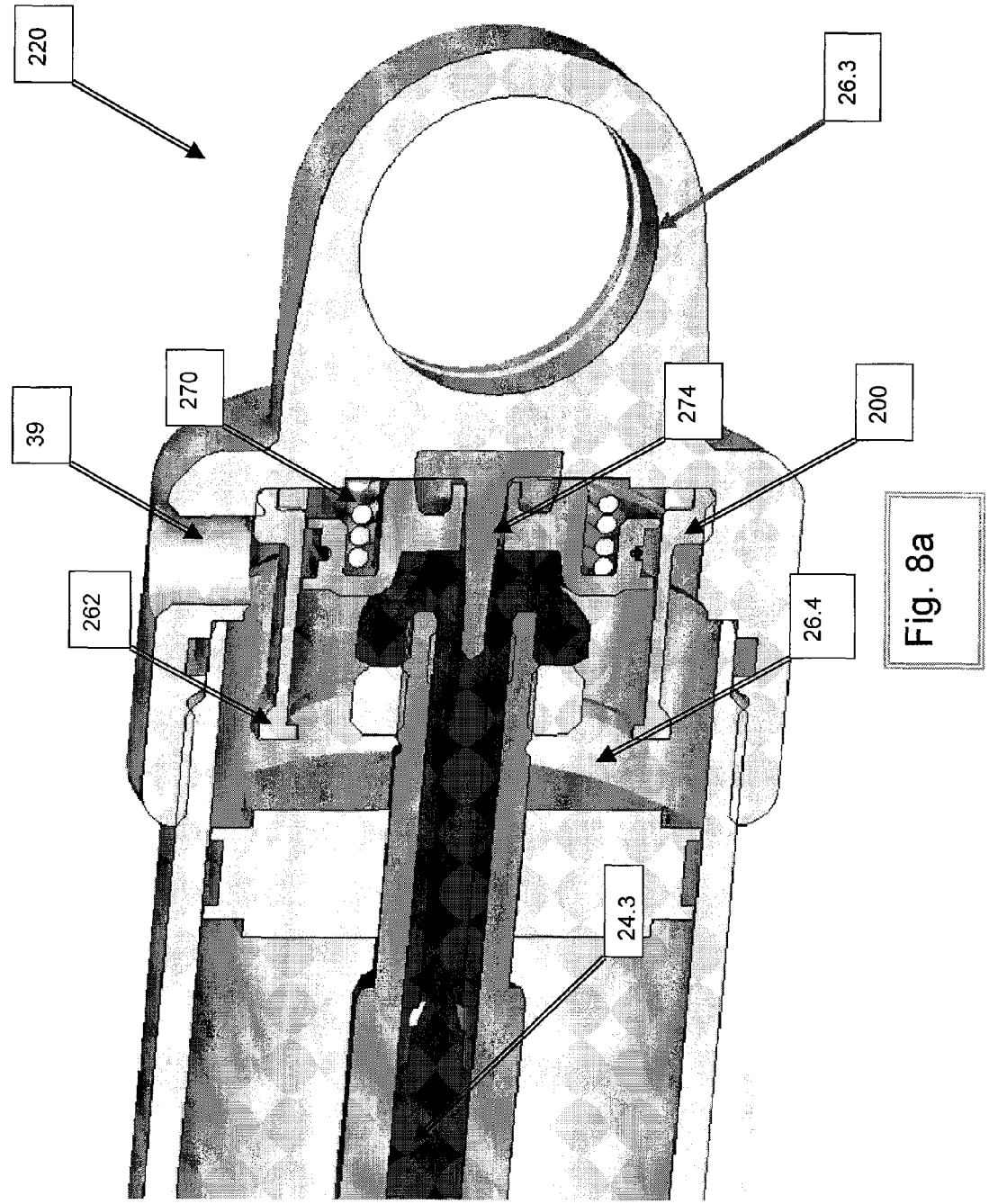

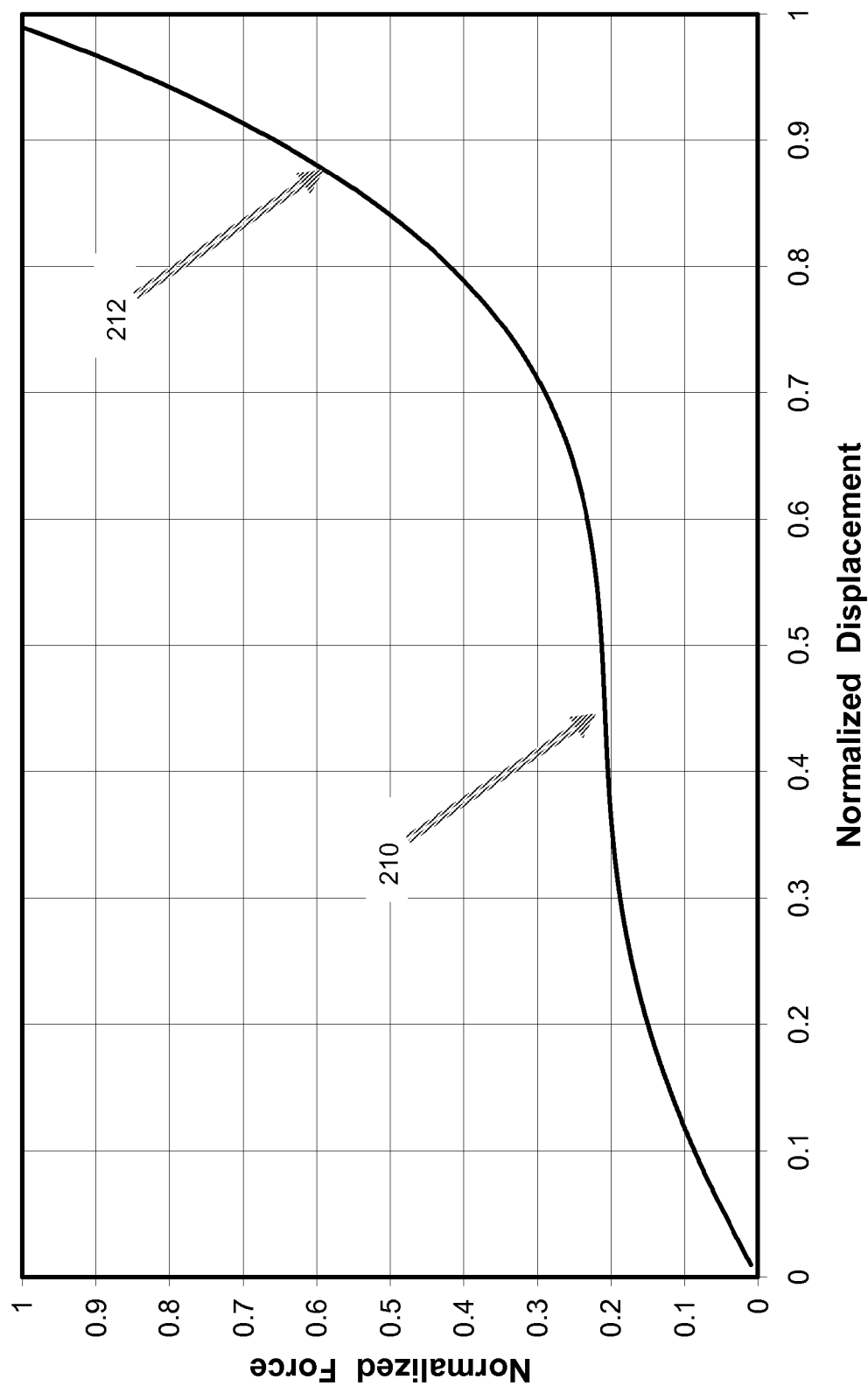

METHODS AND APPARATUS FOR PROTECTING A SHOCK ABSORBER FROM BOTTOMING

This application claims priority to U.S. Provisional Patent Application Ser. No. 60/889,050, filed Feb. 9, 2007, incorporated herein in its entirety.

FIELD OF THE INVENTION

The present invention pertains to improvements in shock absorbers, and more particularly to shock absorbers having position-dependent damping force characteristics.

BACKGROUND OF THE INVENTION

Some vehicles travel over surfaces where there are large surface irregularities. One example of such a vehicle would be an all terrain vehicle traveling over an unprepared surface. Yet other vehicles travel at high speeds over hills, with the prospect of becoming airborne at the top of the hill. An example of such a vehicle would be a motorcycle engaged in a motocross race. Yet other vehicles are subjected to relatively infrequent loads that nonetheless fully compress the suspension. An example of such a vehicle is an aircraft landing on an aircraft carrier. In all of these cases, as well as others, there is a need to design the suspension of the vehicle for the possibility that the vehicle suspension will bottom out in compression. Likewise, there is also a need to design vehicle suspensions for the possibility that the suspension will bottom out in rebound.

Various embodiments of the present invention address these situations in novel and unobvious ways.

SUMMARY OF THE INVENTION

Some embodiments of the present invention pertain to shock absorbers having multiple flowpaths for the constrained flow of hydraulic fluid during compression of a vehicle suspension. In some embodiments one or more of these flowpaths are inactive during some portions of the compressive stroke.

Yet other embodiments of the present invention pertain to a shock absorber having within it a second, internal fluid shock absorber comprising a piston and cylinder that are separated by a spring. In some embodiments the spring forces this piston apart from this cylinder. In yet other embodiments there is a mechanical means for keeping the piston within the sliding interior surface of the cylinder.

Some embodiments of the present invention pertain to a shock absorber which has a first, reduced-force compressive characteristic during an initial portion of the compression of the vehicle suspension. There is a second, increased-force characteristic during a latter portion of this compressive stroke.

Yet other embodiments of the present invention pertain to a shock absorber having at least two flowpaths which are active during at least a portion of the compression of the vehicle suspension. A first characteristic provides a relatively constant resisting force during application of a constant compressive stroking velocity. The second compressive characteristic provides a progressively increasing force through a predetermined range of displacement when moved at a relatively constant compressive stroking velocity.

Some embodiments of the present invention pertain to shock absorbers having multiple flowpaths for the constrained flow of hydraulic fluid during rebound of a vehicle suspension. In some embodiments one or more of these flowpaths are inactive during some portions of the rebound stroke.

It will be appreciated that the various apparatus and methods described throughout this application can be expressed as a large number of different combinations and subcombinations. All such combinations and subcombinations are contemplated herein, it being recognized that the explicit expression of each of these myriad combinations is excessive and unnecessary.

These and other features and aspects of different embodiments of the present invention will be apparent from the claims, specification, and drawings.

BRIEF DESCRIPTION OF THE DRAWINGS

FIG. 2 is a cutaway perspective view of a portion of a shock absorber according to one embodiment of the present invention.

FIG. 3 is a view of the shock absorber FIG. 2 at a different portion of the stroke.

FIG. 4 is a side cutaway view of a portion of the shock absorber of FIG. 2.

FIG. 5 is a side cutaway view of the shock absorber FIG. 2 during refill.

FIG. 6 is a cutaway perspective view of a shock absorber according to another embodiment of the present invention.

FIG. 8a is a cutaway perspective view of the shock absorber of FIG. 7 during a different portion of the stroke.

FIG. 8b is a cutaway side view of the shock absorber of FIG. 8a.

FIG. 9 is a graphical representation of the compressive force of the shock absorber of FIG. 6 as a function of displacement.

FIG. 12b is an enlarged portion of a drawing of FIG. 12a.

FIG. 12c is an enlarged portion of the drawing of FIG. 12a.

FIG. 13b is an enlargement of a portion of the shock absorber of FIG. 13a.

DESCRIPTION OF THE PREFERRED EMBODIMENT

Figure 1A:
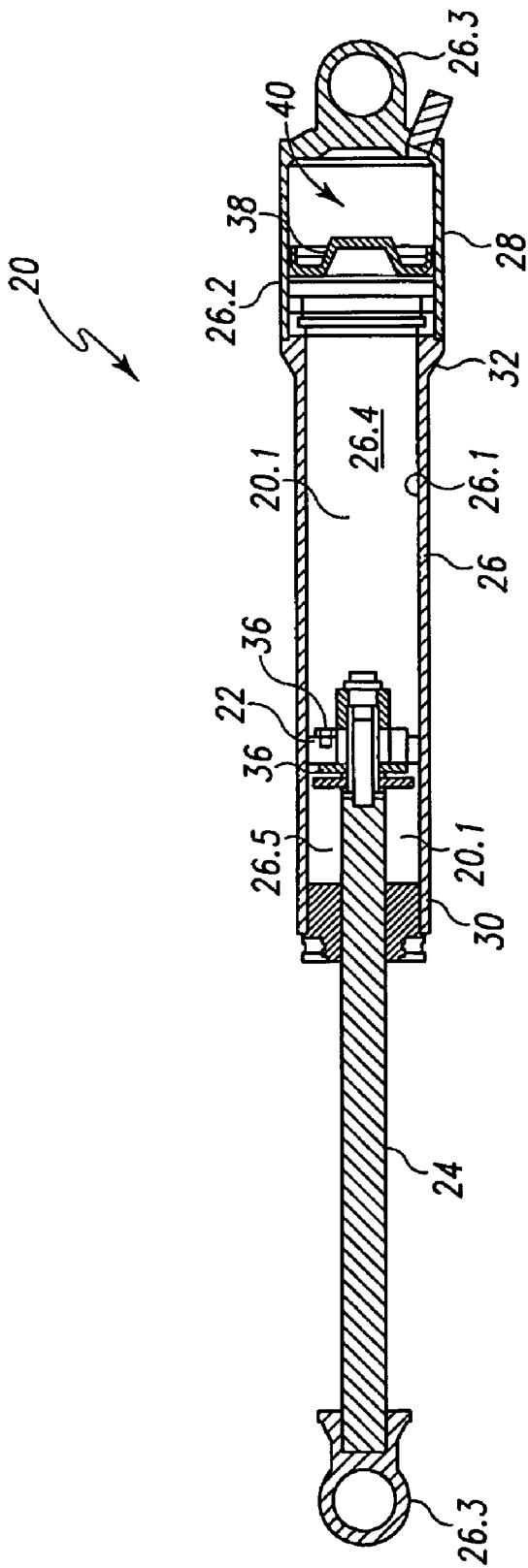
FIG. 1a is a cutaway view of a prior art shock absorber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Some embodiments of the present invention pertain to a shock absorber for a vehicle suspension. The shock absorber includes features that increase the damping force when there is significant travel of the vehicle suspension, such that there is a possibility of the suspension reaching a bottoming out condition in either compression or rebound. In these embodiments, the damping characteristics of the shock absorber depend upon not only the relative velocity of one end of the shock absorber relative to the other end, but also the position of one end of the shock absorber relative to the other position.

In some of these embodiments the shock absorber comprises a main piston slidable within a main cylinder, and further a second shock absorbing apparatus contained within the main cylinder. In some embodiments this second shock absorbing apparatus comprises a secondary piston slidable within a secondary cylinder. This second internal shock absorber is located within the main compression volume of the main cylinder. The secondary piston strokes within the secondary cylinder upon application of a force by the elements of the main shock absorber. In some embodiments, the second shock absorber is active to provide a damping force only during a portion of the compressive stroke of the main shock absorber.

Some embodiments of the present invention are adapted and configured to provide a force that opposes compression of the vehicle suspension with a forcing characteristic that increases significantly as the suspension approaches a bottoming condition. In one embodiment, the main shock absorber provides a forcing characteristic that is relatively constant for a constant stroking velocity during the routine movement of the vehicle suspension. However, if the vehicle suspension approaches bottoming out during compression, the forcing characteristic increases (for a constant velocity) as the stroke nears the bottoming condition.

Yet other embodiments of the present invention pertain to shock absorbers adapted and configured as shown and described herein for the protection of a vehicle suspension from bottoming during rebound of the suspension. The embodiments herein can readily be modified to accommodate the main rod that extends through the rebound chamber in some shock absorbers. As one example, the cylindrical inner pistons and inner cylinders can be made annular, such that the rod extends through the central aperture.

Yet other embodiments of the present invention pertaining to a shock absorber having position-dependent forcing characteristics that resist vehicle compression, and which are externally adjustable, and which can include means for externally adjusting a second flow path. In some embodiments there is provided an external adjustment which alters a fixed-orifice flowpath. Yet other embodiments include an external adjustment which changes the relationship of the position-dependent characteristic relative to the stroking position of the main shock absorber.

FIG. 1 shows a cross-sectional view of a prior art shock absorber 20. A main piston 22 is coupled to a moveable rod 24, piston 22 being slidably received within the inner diameter 26.1 of a main cylinder 26. Piston 22 is retained on the end of rod 24 by a coupling nut 24.2. Main piston 22 generally subdivides the internal volume of cylinder 26 into a compression volume 26.4 located between piston 22 and the compression end 28 of shock 20, and a second rebound volume 26.5 located between piston 22 and the rebound end 30 of shock 20. The movement of piston 22 and rod 24 toward rebound end 32 results in a reduction in the size of compression volume 26.1, and the subsequent flow of hydraulic fluid 20.1 through a compression flowpath 32 in piston 22 and into the simultaneously enlarging rebound volume 26.5. Likewise, movement of piston 22 toward rebound end 30 of shock 20 results in the flow of hydraulic fluid 20.1 through a rebound flowpath 34 in piston 22 and into the simultaneously enlarging compression volume 26.4.

In order to compensate for changes in the density of hydraulic fluid 20.1, shock absorber 20 includes a nitrogen chamber separated by a reservoir piston 38 from the fluid-wetted volume of cylinder 26.

Shock absorber 20 is typically used with the suspension of a vehicle. Rod 24 includes a first suspension attachment 26.3, and end cap 26.2 of cylinder 26 includes a second suspension attachment 26.3. These suspension attachments 26.3 permit the pivotal connection of shock absorber 20 to a portion of the vehicle suspension on one end, and on the other end to a portion of the vehicle frame. It is well known to use shock absorbers on many types of vehicles, including motorcycles, buses, trucks, automobiles, and airplanes. Further, although shock absorber 20 has been referred to for being used on a vehicle, shock absorbers are also known to be used in other applications where it is beneficial to dampen the movement of one object relative to another object, such as dampers for doors.

Compression flowpath 32 includes a fluid passageway interconnecting volumes 26.4 and 26.5 with a one-way valve in the flowpath 32. This one-way valve can be one or more annular shims which are prevented from flexing in one direction (and thus substantially restricting flow), but able to flex in a different direction (and thus allow flow in this opposite direction). Likewise, rebound flowpath 34 provides fluid communication between volumes 26.4 and 26.5 through a one-way valve. Often, the one-way valve of the compression flowpath 32 has different characteristics than the one-way valve of rebound flowpath 34.

Figure 1B:
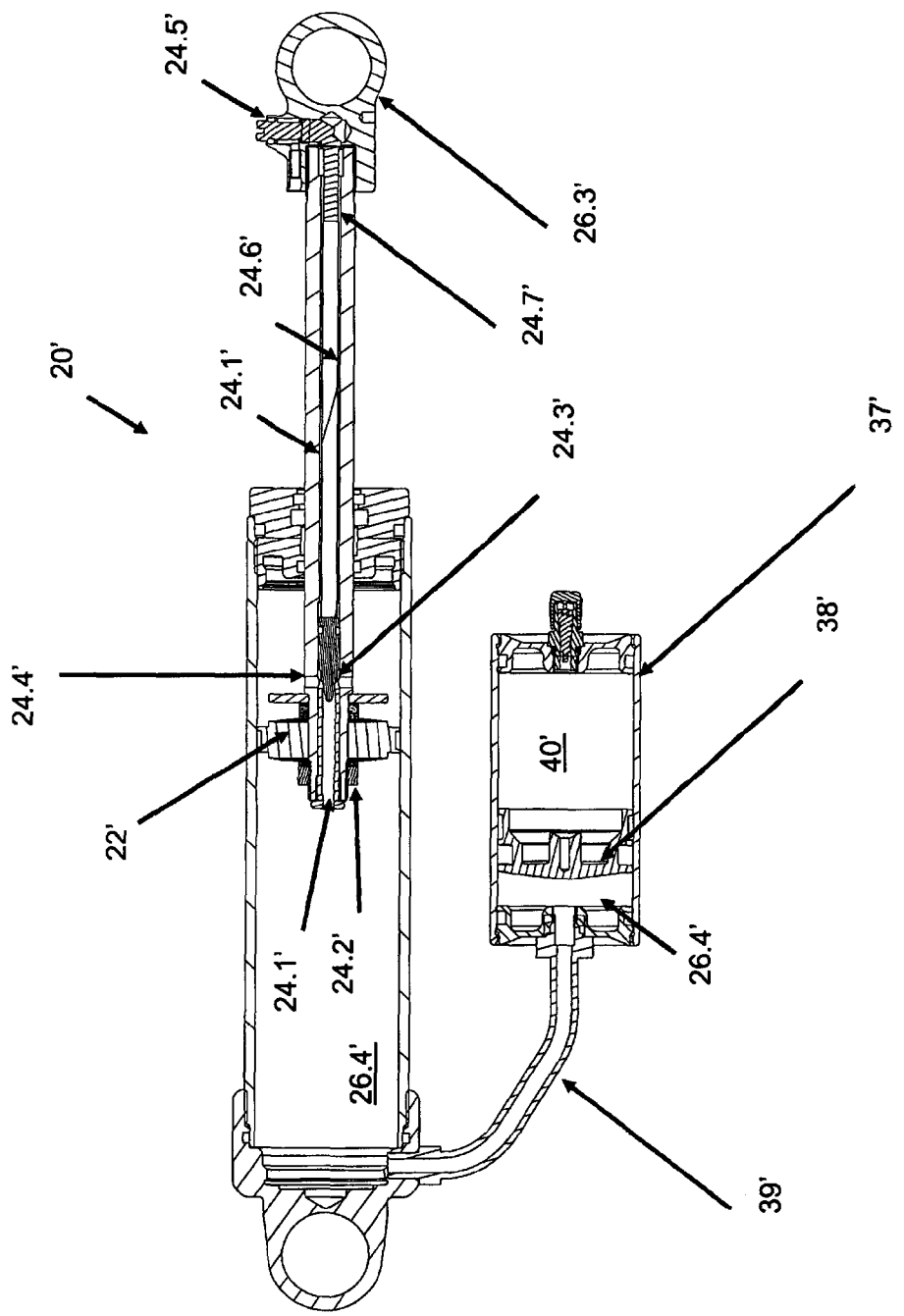
FIG. 1b is a cutaway view of another prior art shock absorber.

FIG. 1b shows a cross-sectional view of a second prior art shock absorber 20'. Shock absorber 20' includes a second, separate cylinder 37' which includes gas reservoir 40'. A piston 38' slidably received within cylinder 37' separates gas volume 40' from compression volume 26.4'. An external fluid connection 39' interconnects the hydraulic fluid end of piston 37' with the compression end of shock absorber 20'. Cylinder 37' includes a gas port in one end of cylinder 37' for entry or removal of nitrogen.

Shock absorber 20' includes means for varying the fluid resistance of a flowpath interconnecting compression volume 26.4' and rebound volume 26.5'. Rod 24' includes an internal passage 24.1' that extends out one end of shaft 24', and extends in the opposite direction towards attachment 26.3'. The open end of internal passage 24.1' is in fluid communication with one or more orifices 24.4' that extend from internal passage 24.1' to rebound volume 26.5'. The flow of fluid through this internal passageway between the compression and rebound volumes is restricted by a metering needle 24.3' received within internal passage 24.1'. The position of metering needle 24.3' can be altered by a pushrod 24.6' also extending within internal passage 24.1'. Push rod 24.6' includes an end 24.7' that is adapted and configured to mate with an internal adjustment screw 24.5'. The inward adjustment of screw 24.5' acts on the angled interface to push rod 24.6' and adjustment needle 24.3' toward a position of increased resistance in the internal flowpath.

Figure 1C:
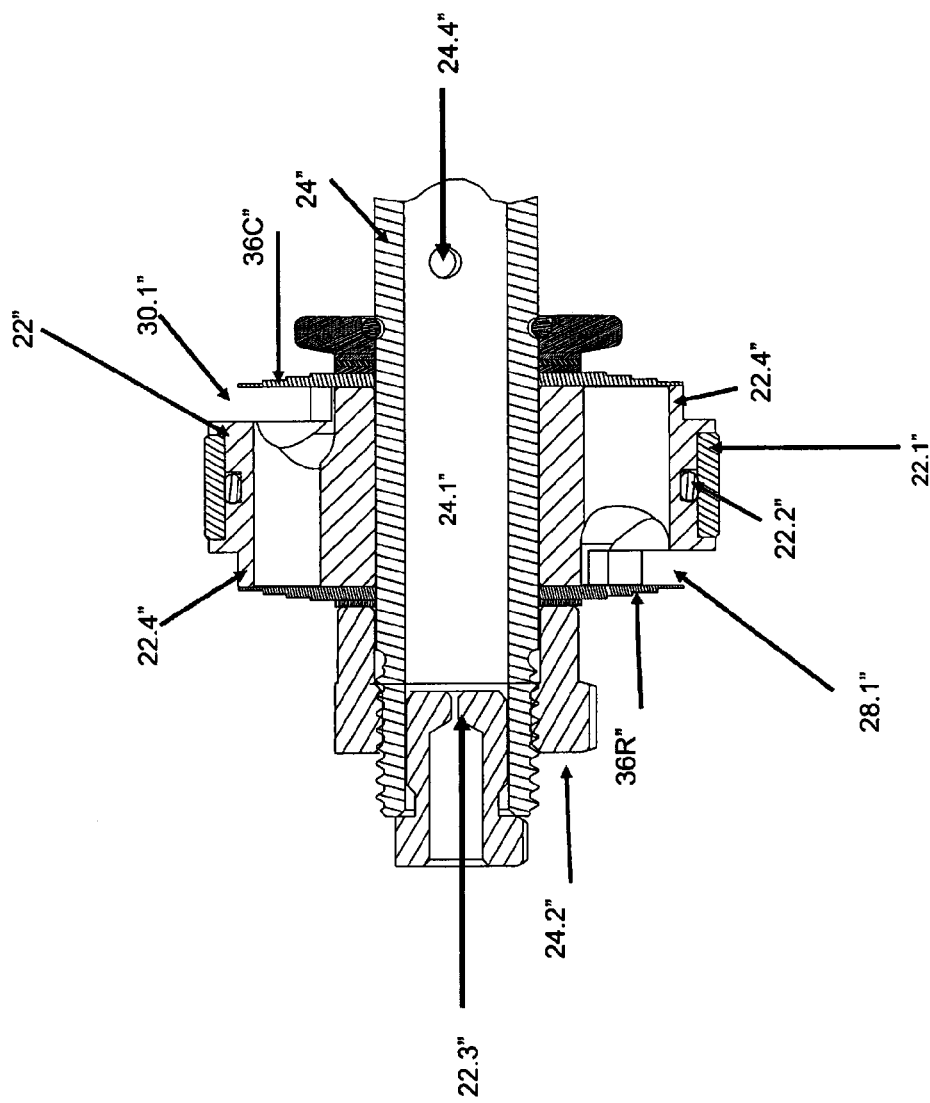
FIG. 1c is a cutaway view of a portion of another prior art shock absorber.

FIG. 1c is a cross sectional view of a portion of another prior art shock absorber. The apparatus in FIG. 1c shows a piston 22" coupled to a shaft 24" by a coupling nut 24.2". Shaft 24" includes an internal flowpath from orifice 22.3" through internal passage 24.1" and into shaft orifice 24.4". This internal flowpath bypasses piston 22".

Piston 22" includes a pair of shim sets 36", each shim set shown including 4 individual washers. During operation in compression (i.e., movement in FIG. 1c toward the left) fluid is able to freely enter compression flowpath 28.1". However, fluid is unable to exit through flowpath 28.1" and into the rebound side of the shock absorber unless fluid pressure is sufficiently great to bend the periphery shim stack 36C" away from the shim edge support 29.4" of piston 22". During operation in rebound, (i.e., movement in FIG. 1c toward the right) fluid is able to freely enter compression flowpath 30.1". However, fluid is unable to exit through flowpath 30.1" and into the compression side of the shock absorber unless fluid pressure is sufficiently great to bend the periphery shim stack 36R" away from the shim edge support 29.4" of piston 22".

A resilient seal 22.1" substantially seals the compressive side of piston 22" from the rebound side of piston 22". An energizing backup seal 22.2" urges seal 22.1" outwardly into contact with the inner wall of the cylinder.

Although what has been shown described is a shock absorber 20 that is linear in operation, the prior art of shock absorbers further includes rotary dampers, such as the toroidal damper disclosed in U.S. Pat. No. 7,048,098, incorporated herein by reference.

As used herein, the word compression refers to the action and direction of the shock absorber during compression of the wheel suspension, this term being synonymous with the term jounce. Therefore, the end of the shock absorber referred to as a compression end is the end which has a reduction in internal volume (due to movement of the piston relative to the cylinder) during compression of the vehicle suspension. The rebound end of the shock absorber is the end that is opposite of the compression end.

FIGS. 2-5 depict a shock absorber 120 according to one embodiment of the present invention. Shock absorber 120 is similar to shock absorber 20, except for the differences noted herein. The use of an N-series prefix for an element number (NXX) refers to an element that is the same as the non-prefixed element (XX), accept as shown and described thereafter.

Shock absorber 120 includes a second internal shock absorber 100 which actively provides damping only during a portion of the c stroke. Internal shock absorber 100 includes a second piston 150 located within a second cylinder 160. Piston 150 is coupled to rod 24 by a piston retaining nut 172.2. Piston 150 is captured within cylinder 160 with a piston retaining member 172.1 that is threaded onto the outer diameter of cylinder 160 after piston 150 is inserted into the interior of cylinder 160. Preferably, a spring 170 biases piston 150 relative to cylinder 160 such that an interior variable volume 160.4 is formed therebetween. As shown and described herein, shock absorber 120 includes a second internal shock absorber that provides damping during a portion of the compressive stroke. However, the present invention also contemplates those embodiments in which the second internal shock absorber is adapted and configured to provide damping during the rebound stroke.

The outer diameter of piston 150 is adapted and configured to support a seal that discourages any leakage of hydraulic fluid between the inner diameter 160.1 of cylinder 160 and the outer diameter of piston 150. Preferably, seal 152 is a resilient seal. In some embodiments, seal 152 comprises multiple members, such as an inner spring or o-ring that forces outward a Teflon© seal.

Internal shock absorber 100 includes a first fluid flowpath 154 for the flow of hydraulic fluid during compression of shock 100, and a second refill flowpath 156 for fluid flowing during the refilling of compression volume 160.4. Referring to FIG. 4, arrows indicate the general direction of flowpath 154. Fluid from compression volume 160.4 flows through one or more orifices or passageways 154.1 in piston 150. The exit of these passageways from shock 100 is preferably through one or more one-way valves 154.2. In one embodiment, these one-way valves include one or more shims 36 captured between coupling nut 24.2 and piston 150. These one-way valves are free to flex open to permit fluid flow out of interior 160.4 into the main compression volume 26.4. However, the outer edge of at least one of these shims is supported by piston 150, and is therefore unable to flex in the opposite direction, and thus unable to permit the flow of fluid into volume 160.4.

FIGS. 2-5 depict the action of shock absorber 120 during compression of a vehicle suspension (not shown). Referring first to FIG. 2, during the initial stages of the compressive stroke, piston 22 and shock absorber 100 are both moving toward compression end 28 by action of rod 24. Hydraulic fluid within compression volume 26.4 is being forced through compression flowpath 32 within piston 22. Piston 22 is active in providing damping during this initial portion of compression stroke. However, both piston 150 and cylinder 160 of shock 100 are moving in unison, with no relative motion there between. Therefore, fluid within compression volume 160.4 remains still within that volume, and shock absorber 100 is inactive during the initial portion of the compression stroke.

Referring to FIG. 3, during an intermediate portion of the compression stroke the forward face 164 of cylinder 160 contacts the opposing face 26.25 of end cap 26.2. Preferably, surfaces 164 and 26.25 are adapted and configured to provide a seal that discourages fluid flow there between. In some embodiments, a resilient seal such as an o-ring can be placed within a groove on one of the surfaces to further discourage leakage of fluid from volume 160.4.

After contact is established between cylinder 160 and end cap 26.2, further movement of rod 24 toward compression end 28 results in relative movement of piston 150 within cylinder 160, such that there is a reduction in the internal volume 160.4 available for fluid 20.1. Fluid is forced to leave interior volume 160.4 by way of compression flowpath 154, such that shock absorber 100 becomes active in providing a force resisting further compression of the vehicle suspension. In some embodiments, piston 22 is adapted and configured to remain active during the entire stroke in providing a force resisting compression of the suspension, such that the total force opposing compression of the suspension results from the flow characteristics of main compression flowpath 32 and secondary compression flowpath 154. In some embodiments, the forces resulting from the flow of fluid along flowpath 154 are substantially greater than the forces required to move fluid along main compression flowpath 32. Second shock absorber 100 actively provides a resistive force as piston 150 slides within cylinder 160. This relative motion continues until piston 150 reaches a mechanical stop, such as an internal stop within cylinder 160 or bottoming of spring 170.

FIG. 5 depicts the refilling of internal shock 100. As the vehicle suspension moves in the rebound direction, rod 24 moves toward rebound end 30 of shock 120, and piston 160 separates from contact with end cap 26.2. Since piston 150 has moved away from the inner lip of retaining member 172.1, it is biased back toward contact with this lip by the action of spring 170. Spring 170 biases piston 150 relative to cylinder 160 such that compression volume 160.4 increases. Fluid flows back into this volume by means of a refilling flowpath. In one embodiment, fluid is free to flow into a central orifice 165 in cylinder 160. In some embodiments, there is an alternate refilling flowpath that provides fluid from main rebound volume 26.5, through one or more refilling orifices 24.4 into an internal passageway 24.1 of rod 24, through a refill passageway 156.1 and piston 150, and through a one-way valve 156.2. In one embodiment, one-way valve 156.2 is comprised of one or more annular shims trapped between retaining nut 172.2 and piston 150. However, although one-way valves are described herein comprising one or more shims supported such that they can flex in only one direction, the present invention contemplates other types of one-way valves, including for example a ball in a pocket supported by a spring.

Figure 7:
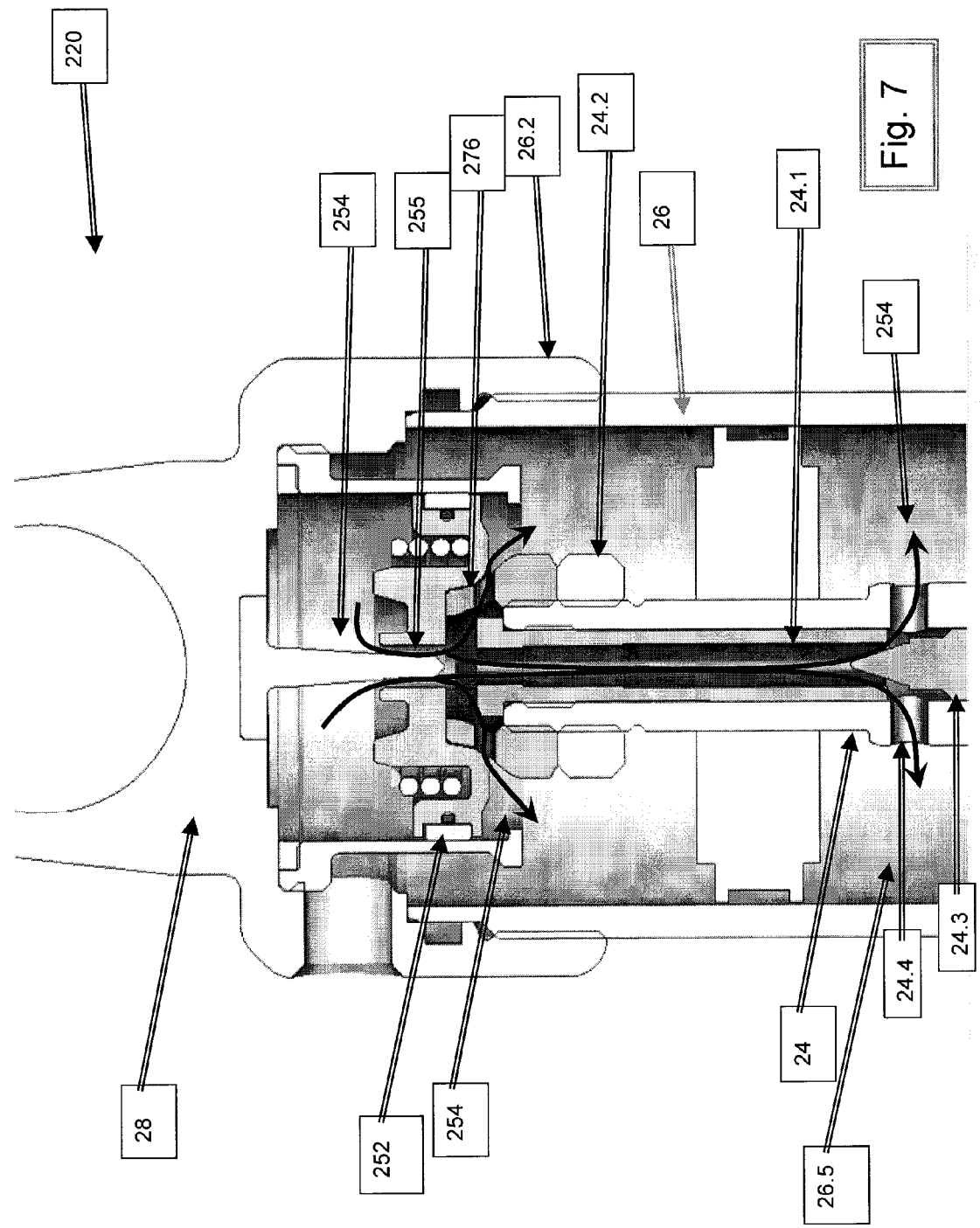
FIG. 7 is a side cutaway view of the shock absorber of FIG. 6 during a different portion of the stroke.
Figure 8B:
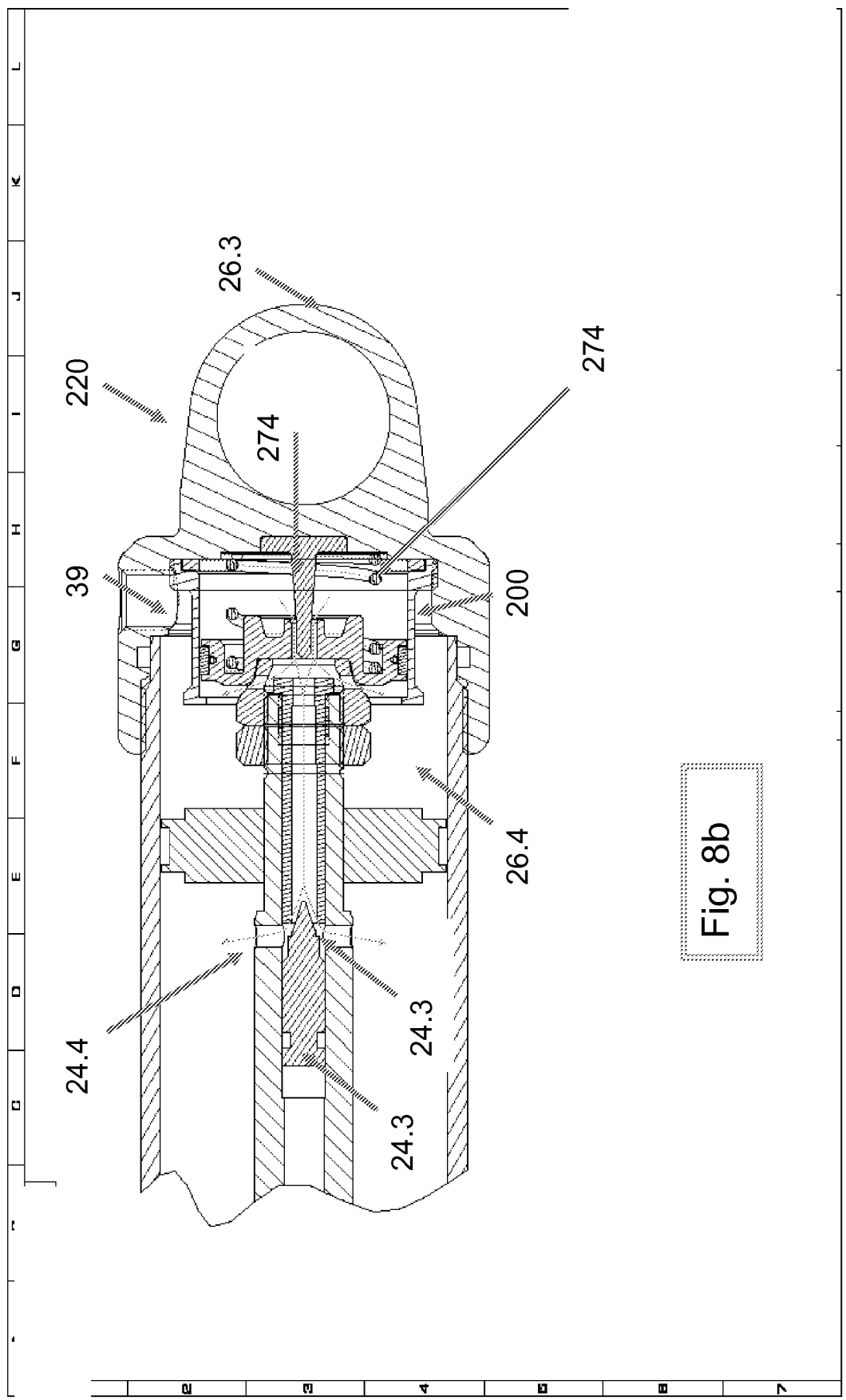

FIGS. 6, 7, and 8 depict a shock absorber 220 according to another embodiment of the present invention. Shock 220 includes a second, internal shock absorber 200 according to another embodiment of the present invention. Internal shock 200 includes a cylinder 260 that is coupled to the internal compression end 28 of shock 220. In one embodiment, cylinder 260 is threadably coupled or otherwise attached to end cap 26.2. A retaining lip 262 of cylinder 260 captures a piston 250 therein. A spring 270 biases piston 250 away from end 28, so as to create an internal compression volume 260.4. In some embodiments, the main cylinder 26 has an inner diameter that is the same as the inner diameter of cylinder 260.

Shock 220 includes a metering needle 274 having a tip and shaft extending through volume 260.4. In one embodiment, needle 274 is captured by end cap 26.2, with the shaft of needle 274 being coaxial with the centerline of shock 220, and thereby being coaxially aligned with rod 24 and internal passage 24.1. Further, piston 250 includes within it a central orifice 255 which is adapted and configured to receive within it the tip and shaft of needle 274. Piston 250 is slidable within the inner diameter of cylinder 260. Further, in some embodiments, piston 250 is sealed within the inner diameter of cylinder 260 by a resilient seal assembly 252.

Rod 24 of shock 220 includes a central passage 24.1 which provides fluid communication with rebound volume 26.5, through a pair of orifices 24.4 and an adjustable main metering needle 24.3. This central passageway 24.1 is open through the end of rod 24 and through a ram 276 attached to the end of rod 24. One or more coupling nuts 24.2 hold ram 276 in place. Piston 250 preferably includes a pocket adapted and configured to receive ram 276.

In those embodiments of the present invention pertaining to protection for bottoming during rebound of the suspension, piston 250 and cylinder 260 are annular, with rod 24 extending through an inner aperture of cylinder 260. Preferably, the piston seals against the inside surfaces of both the inner wall and outer wall of the cylinder. Preferably, there are a plurality of metering needles 274 equally spaced around the cylinder.

During the initial portion of the compression stroke, the damping forces of shock absorber 220 are provided by a main compression flowpath 32. As best seen in FIG. 6, this compression flowpath extends from the central passageway of rod 24 within compression volume 26.4, past metering needle 24.3, through orifices 24.4, and into rebound volume 26.5. During the initial portion of the compression stroke, second shock absorber 200 is inactive, and does not provide any damping force.

As the vehicle suspension continues to compress, ram 276 of rod 24 comes into contact with the complimentary-shaped pocket of piston 250. Further, the central passageway 24.1 through rod assembly 24 generally aligns with central orifice 255 of piston 250. As shock absorber 220 continues in the compression stroke, ram 276 pushes piston 250 relative to cylinder 260. This relative motion results in a reduction in compression volume 260.4, and hydraulic fluid 20.1 flows through an annular orifice formed between the outer surface of needle 274 and the central passage 255 of piston 250. The hydraulic fluid flowing past needle 274 and orifice 255 continues to flow along alternate compression flowpaths 254. One flowpath flows through a series of orifices in the sidewalls of ram 276 and into compression volume 26.4. Yet another flowpath continues down central passage 24.1 and into rebound volume 26.5.

In some embodiments, needle 274 has an exterior shape adapted and configured to provide variable damping characteristics. In one embodiment, the distal end of the metering needle starts with a conical tip, transitions to a generally cylindrical shape, which transitions to a tapered, conical shape over a central portion of needle 274, and finally to a larger, generally cylindrical final diameter near the end of the needle.

As an illustrative example, in one embodiment the initial diameter of needle 274 is about ½ of the inner diameter of central orifice 255. The final diameter of the needle is approximately 80% to 95% of the inner diameter of orifice 255. These two regions of the needle are interconnected with a taper between about 5 degrees to about 11 degrees.

The damping characteristics of one version of this illustrative example are shown in FIG. 9. The graph of FIG. 9 shows the normalized compressive stroke forces as a function of the normalized displacement of rod 24 as the rod is oscillated at a constant rate. During the initial part of the compression stroke, there is a first compression force characteristic 210 which is relatively constant between 0.2 and 0.25 in a nondimensional displacement range from about 0.3 to about 0.6. During this initial range, compressive forces are provided by the flow of hydraulic fluid through the main compression flowpath 32.

At a non-dimensional displacement of about 0.6 to 0.7, contact is achieved between ram 276 and piston 250. Through the non-dimensional displacement range of about 0.7 to 1.0, there is a much steeper compression characteristic 212 which is a result of the flow of hydraulic fluid through both main compression flowpath 32 and second compression flowpath 254.

As rod 24 and ram 276 retract away from piston 250, spring 270 biases piston 250 away from the compression end 28 of shock 220. As the piston continues to move under the action of spring 270, compression volume 260.4 refills with hydraulic fluid flowing in the reverse direction along flowpath 254. A retaining lip 262 of cylinder 260 keeps piston 250 captured within cylinder 260.

Figure 10:
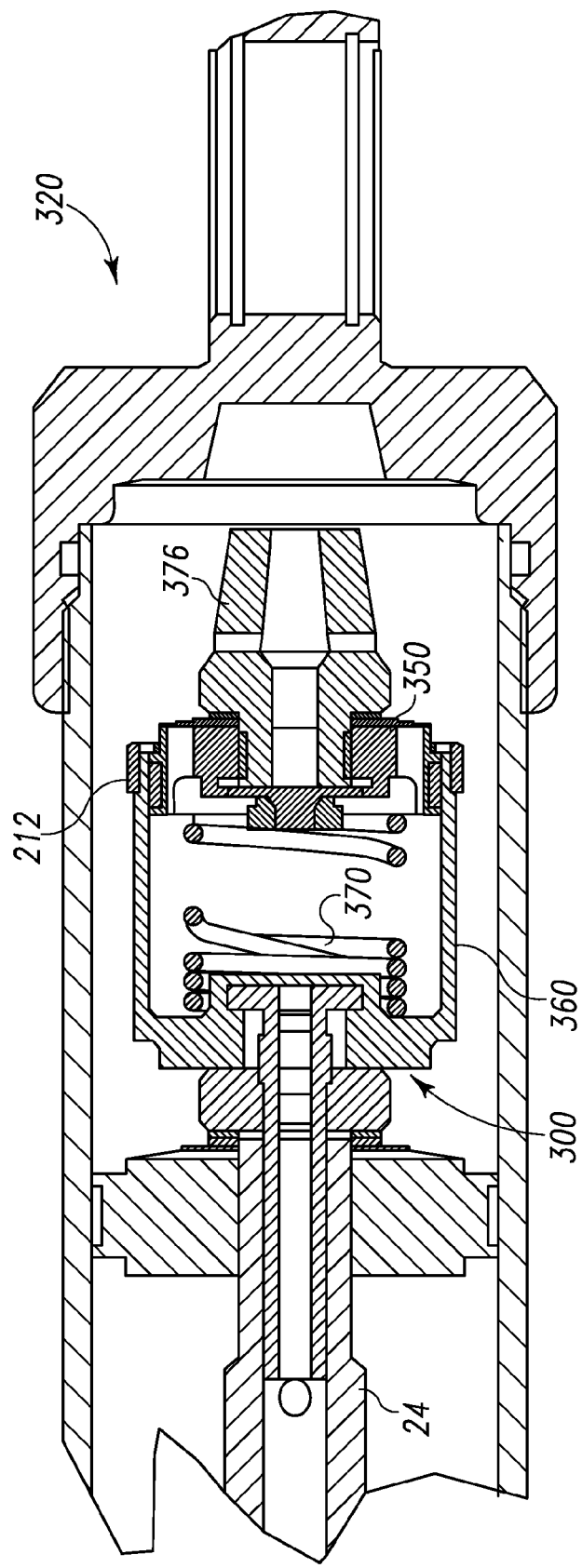
FIG. 10 is a cutaway side view of a shock absorber according to another embodiment of the present invention.
Figure 11:
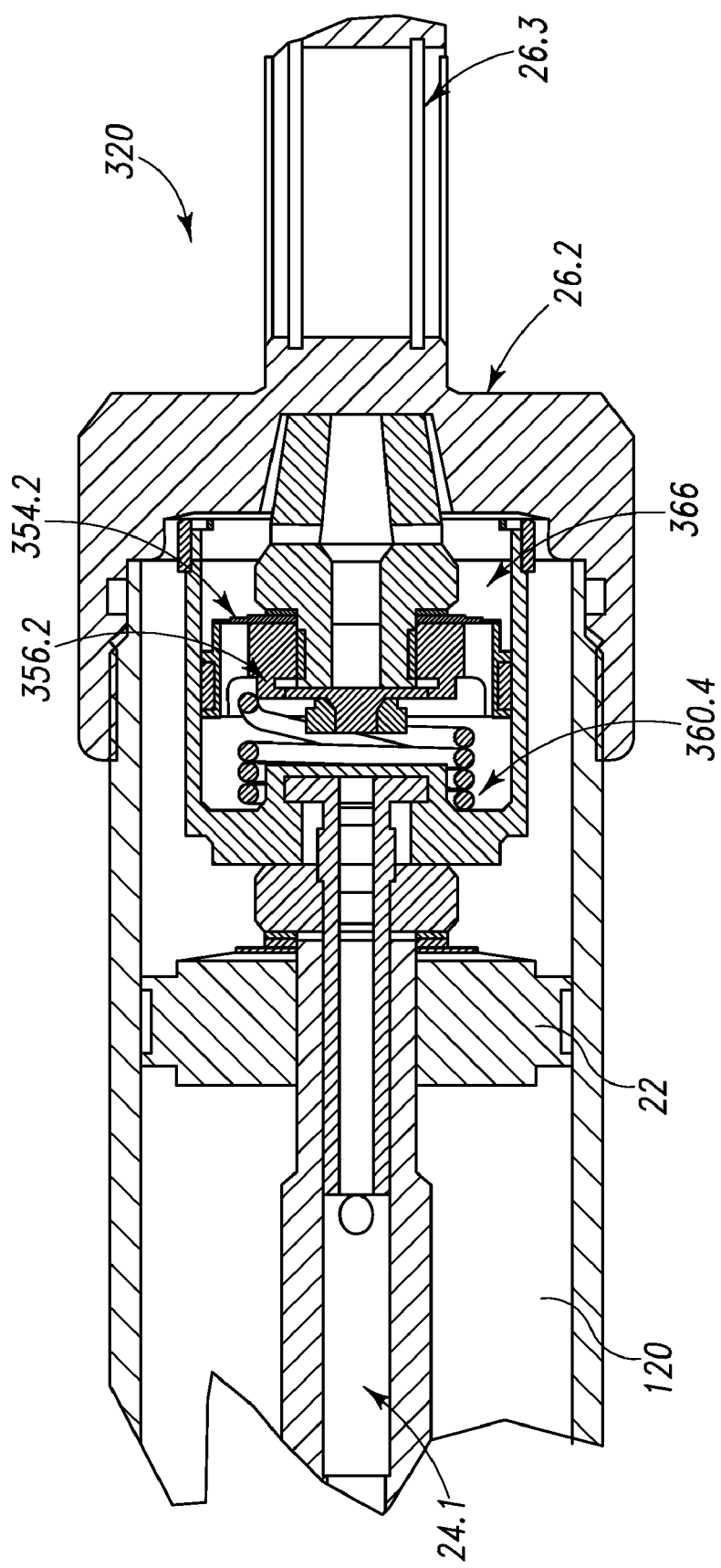
FIG. 11 is a cutaway side view of the shock absorber of FIG. 10 which has been further compressed.

FIGS. 10-11 depict a portion of a shock absorber 320 according to another embodiment of the present invention. Shock absorber 320 includes a second internal shock absorber 300 which is coupled to the end of rod 24. Shock absorber 300 includes a piston 350 outwardly biased by a spring 370 from the bottom of a cylinder 360. The bottom end of cylinder 360 is coupled to the end of rod 24. Piston 360 is captured within cylinder 360 by a piston retaining member 372.1. Piston 350 and cylinder 360 form a compression volume 360.4 therebetween. Piston 360 includes a one-way valve 354.2 preferably formed by one or more shims in a manner as previously described. One-way valve 354.2 provides controlled resistance to the flow of fluid out of chamber 360.4, and the discouragement of fluid flow into chamber 360.4.

Shock absorber 320 includes a ram 376 attached to piston 360. Preferably, ram 376 includes a central flow passage in fluid communication with a one-way valve 356.2 that form part of a refill flowpath 356 for refilling chamber 360.4 during rebound.

As best seen in FIG. 10, during the initial portion of the compressive stroke, the resistive force applied by shock absorber 320 is provided by the flow of fluid through a main compression flowpath 32 as previously described. Internal shock absorber 300 is not active during the initial portion of the stroke.

Referring to FIG. 11, as ram 376 contacts end cap 26.2 located on the compression end of shock 320 (FIG. 11 showing a portion of ram 376 being received within a pocket of end cap 26.2), further compressive motion of rod 24 results in the motion of cylinder 360 relative to piston 350. This relative motion reduces the size of compression volume 360.4, with fluid 20.1 subsequently flowing through compression flowpath 354, out of one-way valve 354.2, and into a reservoir 366 formed by cylinder 360, end cap 26.2, and piston 350. As piston 350 moves relative to cylinder 360, second shock absorber 300 becomes active and adds to the force of shock absorber 320 which resists compression of the vehicle suspension.

Figure 12A:
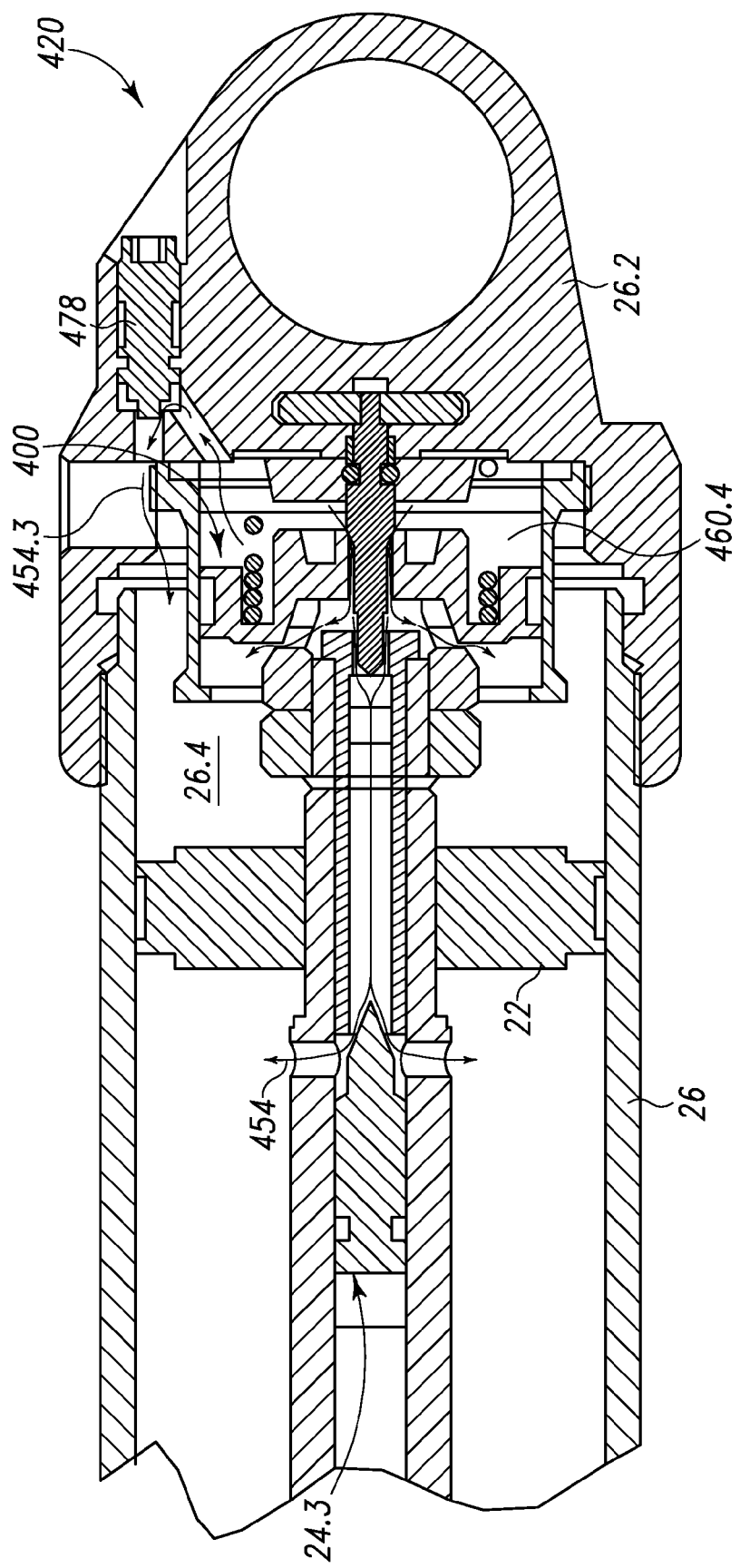
FIG. 12a is a cutaway side view of a shock absorber according to another embodiment of the present invention.
Figure 12B:
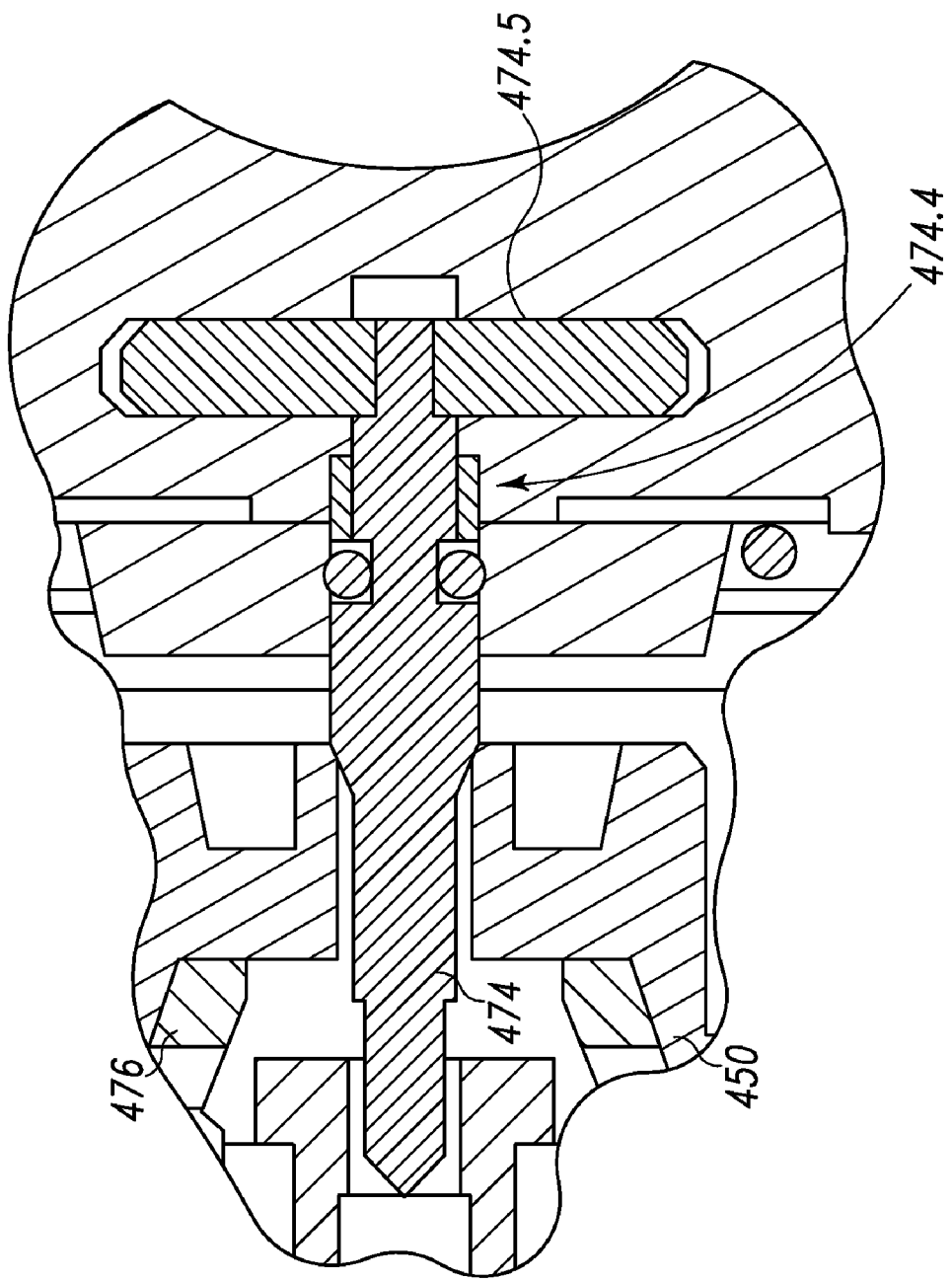
Figure 12C:
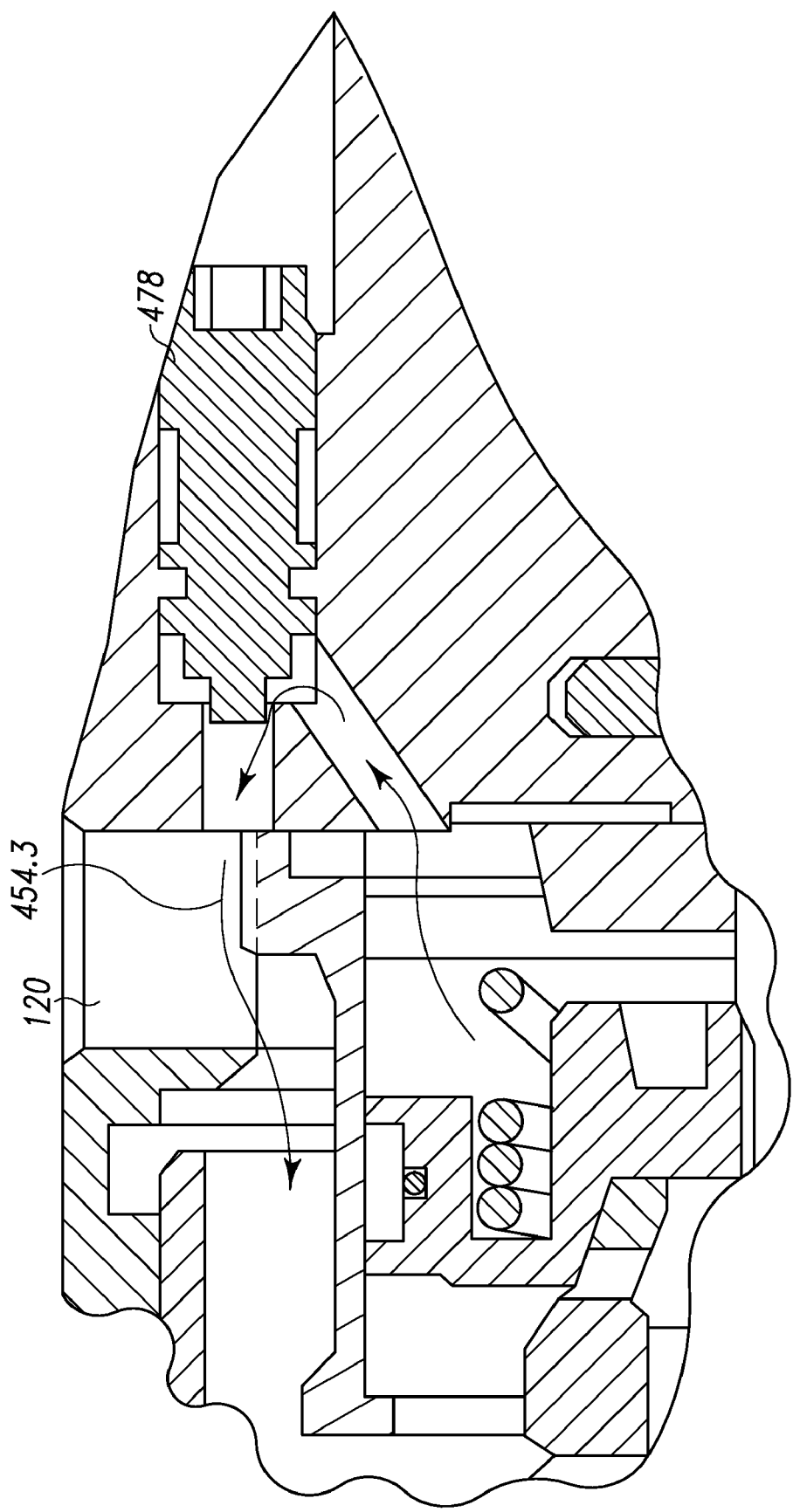

FIGS. 12*a*, 12*b*, and 12*c* are cutaway views of a shock absorber 420 according to another embodiment of the present invention. Shock absorber 420 is the same as shock absorber 220 as previously described, except for the changes which are shown and described herein. Shock absorber 420 includes means for externally adjusting the second flow path as is shown and will be described.

Shock absorber 420 includes one or more features for externally adjusting the damping characteristics of second internal shock absorber 400. In one embodiment, shock absorber 400 includes two features for externally adjusting the damping of the second compression characteristic (i.e., when the internal shock absorber 400 is active). However, some embodiments include only one of these features to be described.

Shock absorber 400 includes an auxiliary compression flowpath 454.3 that is externally adjustable. As best seen in FIGS. 12*a* and 12*c*, auxiliary path 454.3 includes a first passageway in end cap 26.2 interconnecting compression volume 460.4 with an adjustment screw 478. The external end of screw 478 is sealed from the fluid environment, and includes an adjustment feature such as an internal hex head or external hex head. The other end of screw 478 is in fluid communication with the first passageway previously described, and also with a second passageway that is in fluid communication with compression volume 26.4. Screw 478 is threadably received within end cap 26.2. As the screw is turned along the threads, a nose of screw 478 projects more or less into the second flow passage, and thereby forms more or less of a restriction to flow. Adjustment of screw 478 results in a fixed-characteristic fluid bypass.

In some embodiments, shock absorber 420 includes a second external adjustment feature, as best seen in FIGS. 12*a* and 12*b*. Metering needle 474 is threadably received within end cap 26.2. One end of the body of needle 474 projects into a slotted adjuster wheel 474.5. Adjuster wheel 474.5 is externally accessible and turnable by a person's hand. Turning of wheel 474.5 results in axial movement of needle 474 relative to end cap 26.2. By this axial movement of needle 474, the metering portions of the shaft are displaced, with a subsequent change in the displacement characteristics of shock absorber 420. Referring to FIG. 9, the second compression characteristic of shock 420 can be moved laterally along the displacement axis.

Figure 13A:
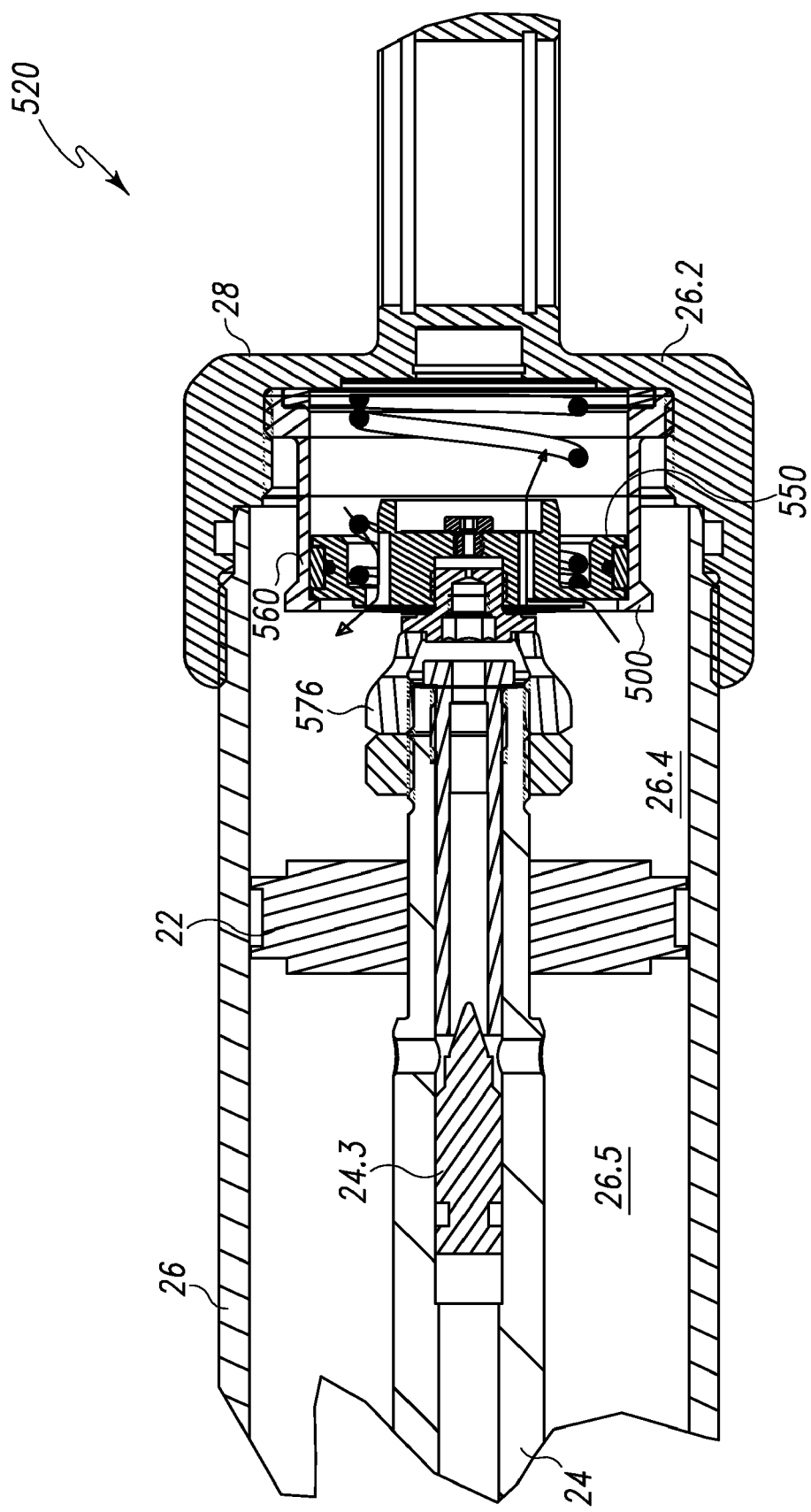
FIG. 13a is a side elevational cutaway view of a portion of shock absorber according to another embodiment of the present invention.
Figure 13B:
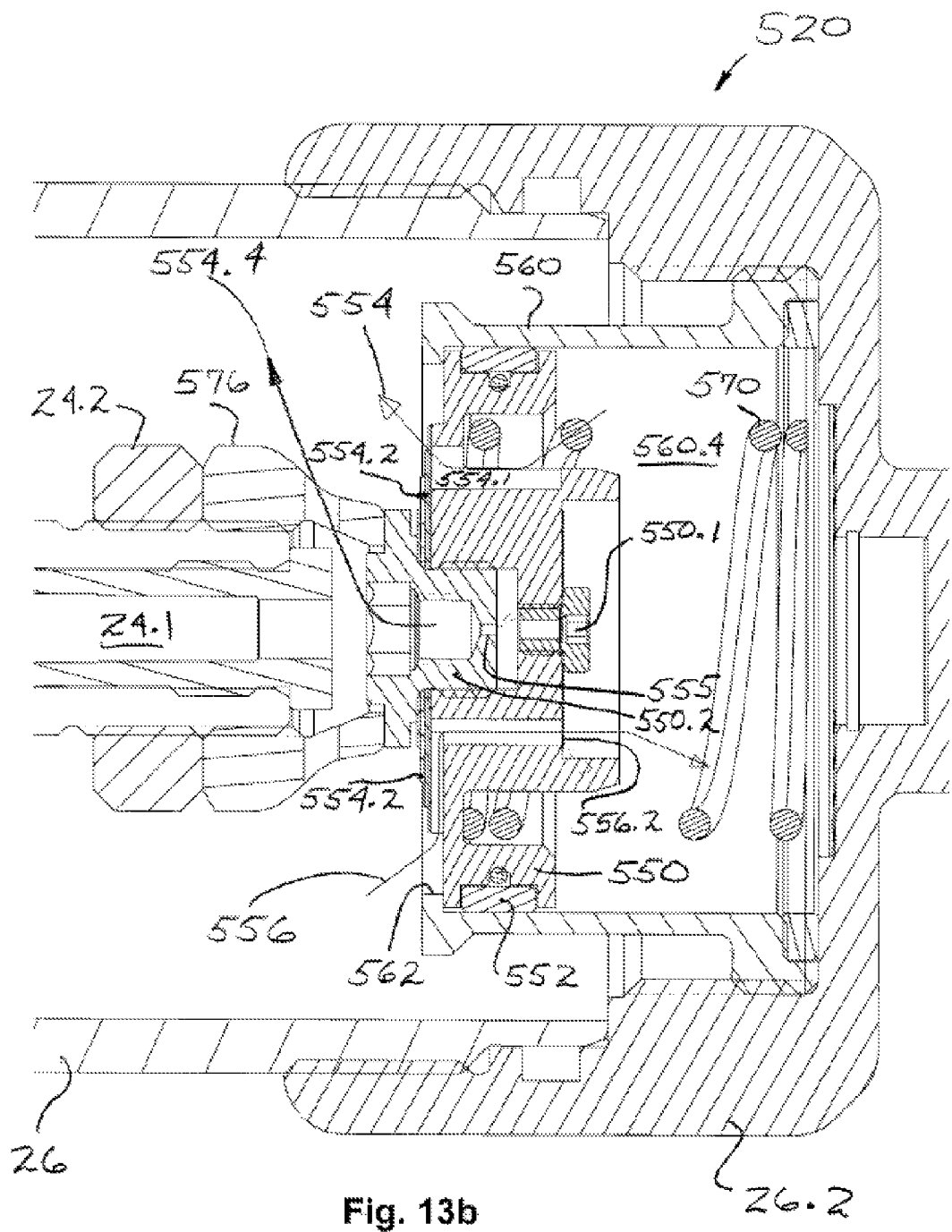

FIGS. 13*a* and 13*b* depict portions of a shock absorber 520 according to another embodiment of the present invention. A shock 520 includes a second internal shock absorber 500 which provides damping during a portion of the stroke of the rod relative to the shock absorber cylinder. Shock 520 is shown partly compressed, with ram 576 making contact with second internal shock absorber 500. Internal shock 500 includes a cylinder 560 that is coupled to the internal compression and the 28 of shock 520. In one embodiment, cylinder 560 is threadably coupled to end cap 26.2. Internal shock absorber 500 includes second piston 550 located within a second cylinder 560. A retaining ridge 562 of cylinder 560 captures piston 550 therein. A spring 570 biased piston 550 away from end 28, so as create an internal compression volume 560.4. A circumferential seal 552 is outwardly biased by a circumferential spring into sealing contact with the inner diameter of piston 560.

Piston 550 includes a central passage 550.1 through which fluid from volume 560.4 can flow. Further, piston 550 includes a plurality of shims 554.2 which provide a restriction to flow from volume 560.4 through passageway 554.1, as indicated by compression flowpath arrow 554. However, valve 554.2 does not present appreciable restriction to a refilling flowpath 556. Instead, a shim 556.2, retained on the opposite side of piston 550, deflects to allow a refilling flow to chamber 560.4, but substantially prevents flow out of chamber 560.4. Piston 550 includes a threaded insert 550.2 that includes a central orifice 555 in fluid communication with passageway 550.1 and internal volume 560.4. As best seen in FIG. 13*b*, insert 550.2 is adapted and configured to abut against the end of ram 576.

During compression of shock absorber 520, ram 576 (which is threadably captured to rod 24) makes contact with threaded insert 550.2, and any further increase in compression stroke pushes piston 550 relative to cylinder 560. During this stroking of second internal shock absorber 500, hydraulic fluid within chamber 560.4 can flow out through parallel compression flowpaths.

One flowpath for hydraulic fluid is through central passage 550.1, through central orifice 555, and into internal passage 24.1 of rod 24. This fluid can pass into compression volume 26.4 by way of flow passages within ram 576 (as indicated by compression flowpath arrow 554.4), and further through internal passage 24.1, past the restriction of metering needled 24.3, and into rebound volume 26.5 (as best seen in FIG. 13*a*). In addition, fluid expelled from volume 560.4 during stroking of piston 550, can flow via flowpath 554 into compression volume 26.4. This flowpath is open when the pressure differential across piston 550 is large enough to deflect the one-way valve 554.2.

When rod 24 retracts, piston 550 is biased to move and refill volume 560.4 and refill volume 560.4 by spring 570. Hydraulic fluid refills volume 560.4 by way of flowpath 556 past one-way valve 556.2. Fluid can also refill in a parallel flowpath through orifice 555 and passage 550.1.

One embodiment of the present invention pertains to an hydraulic shock absorber for damping compression and rebound of a vehicle suspension. The embodiment also includes a first piston coupled to a rod and slidably received within a first cylinder, the first piston and the first cylinder defining a first variable hydraulic volume that reduces in size during rebound of the suspension. A second piston is slidably received and captured within a second cylinder, the second piston and the second cylinder defining a second variable hydraulic volume that reduces in size during rebound of the suspension, the second cylinder being located within the first fluid volume. The second volume refills with hydraulic fluid during compression of the suspension.

Another embodiment of the present invention pertains to a method for damping rebound of a vehicle suspension. The embodiment includes providing a first piston slidably received within a first cylinder and a second piston slidably received within a second cylinder, the second cylinder being located within the first cylinder, the first piston being in fluid communication with a first flowpath for hydraulic fluid, the second piston being in fluid communication with a second flowpath for the hydraulic fluid. The embodiment includes rebounding the vehicle suspension by a first amount and sliding the first piston relative to the first cylinder during the rebounding by a first amount. The embodiment includes forcing hydraulic fluid through the first flowpath by sliding the first piston during the rebounding by a first amount, and not sliding the second piston relative to the second cylinder during the rebounding by a first amount. The embodiment includes rebounding the vehicle suspension by a second amount following the first amount, sliding the first piston relative to the first cylinder during the rebounding by a second amount, and sliding the second piston relative to the second cylinder during the rebounding by a second amount. The embodiment includes forcing hydraulic fluid through the second flowpath by sliding the second piston during the rebounding by a second amount.

Another embodiment of the present invention pertains to a hydraulic shock absorber for damping compression and rebound of a vehicle suspension. The embodiment includes a first piston coupled to a rod and slidably received within a first cylinder, the first piston and the first cylinder defining a first variable hydraulic volume that reduces in size during rebound of the suspension. The embodiment includes a second piston slidably received within a second cylinder, the second piston and the second cylinder defining a second variable hydraulic volume that reduces in size during rebound of the suspension. The second cylinder is located within the first fluid volume. There is a sealing member between the second piston and the second cylinder for sealing the second volume, wherein the second volume refills with hydraulic fluid during compression of the suspension.

Another embodiment of the present invention pertains to a hydraulic shock absorber for damping rebound of a vehicle suspension which compresses and rebounds. The embodiment includes a first piston coupled to a rod and slidably received within a first cylinder, the first piston and the first cylinder defining a first variable hydraulic volume that reduces in size during rebound of the suspension, at least one of the first piston or the first cylinder defining a first flowpath for fluid during rebound of the suspension. The embodiment includes a second piston slidably received within a second cylinder, the second piston and the second cylinder defining a second variable hydraulic volume that reduces in size during rebound of the suspension, at least one of the second piston or the second cylinder defining a second flowpath for fluid during rebound of the suspension. The embodiment includes a means for externally adjusting the second flowpath independently of the first flowpath.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hydraulic shock absorber for damping compression of a vehicle suspension, comprising:
    a first piston coupled to a rod and slidably received within a first cylinder, said first piston and said first cylinder defining a first variable hydraulic volume that reduces in size during compression of the suspension; and
    a second piston slidably received and captured within a second cylinder, said second piston and said second cylinder defining a second variable hydraulic volume that reduces in size during compression of the suspension with fluid exiting the second variable volume flowing along a second flowpath; and
    an externally adjustable member for varying the flow characteristics of fluid exiting the second variable volume;
    wherein said first piston has a maximum stroke length within said first cylinder from full rebound to full compression, and fluid exits the second variable volume only during the portion of stroke proximate to full compression;
    wherein said second piston is attached to said rod;
    wherein said second piston includes a one-way valve which permits flow into said second volume but restricts flow out of said second volume;
    wherein said rod includes an internal passage which provides fluid communication between said one-way valve and a third variable fluid volume defined by said first piston and said first cylinder that reduces in size during rebound of the suspension.

2. The shock absorber of claim 1 which further comprises a spring, said spring biasing said second piston relative to said second cylinder in a direction to assist refilling of said second volume.

3. The shock absorber of claim 1 wherein said first variable volume has a first maximum size, said second variable volume has a second maximum size, and the first maximum size is greater than the second maximum size.

4. The shock absorber of claim 1 wherein said first cylinder has a first inner diameter, said second cylinder has a second inner diameter, and the first inner diameter is greater than the second inner diameter.

5. The shock absorber of claim 1 which further includes a resilient seal, said seal sealing said second piston within said second cylinder.

6. The shock absorber of claim 1 wherein said second cylinder is attached to said rod.

7. The shock absorber of claim 1 wherein said second piston includes a one-way valve which permits flow out of said second volume but restricts flow into said second volume.

8. The shock absorber of claim 1 wherein said valve includes at least one annular shim.

9. The shock absorber of claim 1 wherein said second cylinder is attached to said first cylinder.

10. The shock absorber of claim 9 wherein said second piston includes a hydraulic fluid metering orifice, said adjustable member comprises a metering needle, wherein said needle is received within said orifice during compression.

11. The shock absorber of claim 10 wherein said needle is tapered to reduce the flow area of said orifice as the suspension compresses.

12. The shock absorber of claim 9 wherein said rod includes an internal passage which provides fluid communication between said first volume and a third variable fluid volume defined by said first piston and said first cylinder that reduces in size during rebound of the suspension 13. The shock absorber of claim 9 wherein said second piston includes a plurality of parallel flowpaths providing fluid communication from the second hydraulic volume to the first hydraulic volume.

14. The shock absorber of claim 1 wherein said shock absorber includes an orifice, and wherein adjustment of said externally adjustable member changes a flow area of the orifice.

15. A method for damping compression of a vehicle suspension, comprising:

providing a first piston slidably received within a first cylinder and a second piston slidably received within a second cylinder, the second piston being captured within the second cylinder, the first piston being in fluid communication with a first flowpath for hydraulic fluid, the second piston being in fluid communication with a second flowpath for the hydraulic fluid;
compressing the vehicle suspension by a first amount;
sliding the second piston relative to the first cylinder during said compressing by the first amount;
sliding the first piston relative to the first cylinder during said compressing by the first amount;
forcing hydraulic fluid through the first flowpath by said sliding the first piston during said compressing by the first amount;
not sliding the second piston relative to the second cylinder during said compressing by the first amount;
compressing the vehicle suspension by a second amount following the first amount;
sliding the first piston relative to the first cylinder during said compressing by the second amount;
sliding the second piston relative to the second cylinder during said compressing by the second amount;
forcing hydraulic fluid through the second flowpath by said sliding the second piston during said compressing by the second amount and achieving a first damping force characteristic; and
externally adjusting the second flowpath to achieve a second damping force characteristic different than the first damping force characteristic.

16. The method of claim 15 which further comprises biasing the second piston relative to the second cylinder to refill the second cylinder with hydraulic fluid during rebounding of the suspension following said sliding the second piston by the second amount.

17. The method of claim 15 wherein the second cylinder and the first cylinder are located along the same axis.

18. A hydraulic shock absorber for damping compression of a vehicle suspension, comprising:
a first piston coupled to a first rod and slidably received within a first cylinder, said first piston and said first cylinder defining a first variable hydraulic volume that reduces in size during compression of the suspension;
a second piston slidably received within a second cylinder, said second piston and said second cylinder defining a second variable hydraulic volume that reduces in size during compression of the suspension, said second cylinder being located within said first fluid volume, said second piston including an aperture providing fluid communication between said first volume and said second volume; and
a metering rod received within the aperture, said second piston being movable relative to said metering rod;
wherein movement of said piston relative to said metering rod changes the flow characteristic for fluid flowing between said first volume and said second volume.

19. The shock absorber of claim 18 which further comprises a spring biasing apart said second cylinder from said second piston.

20. The shock absorber of claim 18 wherein said metering rod includes a tapered portion.

21. The shock absorber of claim 18 wherein the position of said metering rod is externally adjustable.

22. The shock absorber of claim 18 wherein said first piston and said first cylinder define a third variable hydraulic volume that increases in size during compression of the suspension, said first rod includes a central flowpath providing fluid communication between said first volume and said third volume, said metering rod includes an end, and the end is received within the central flowpath.

23. The shock absorber of claim 18 wherein said second cylinder includes a flowpath from the second volume to the first volume.

24. The shock absorber of claim 23 wherein the pressure drop characteristics of the flowpath are externally adjustable.

25. The shock absorber of claim 18 which further comprises a spring, said spring biasing said second piston relative to said second cylinder in a direction to assist refilling of said second volume.

26. The shock absorber of claim 18 wherein said second piston is captured within said second cylinder.

27. The shock absorber of claim 18 wherein said first rod includes a central flowpath for the flow of hydraulic fluid, said metering rod includes an end, and the end is received within the central flowpath.

28. The shock absorber of claim 18 wherein said first piston has a maximum stroke length within said first cylinder from full rebound to full compression, and fluid exits the second variable volume only during the portion of stroke proximate to full compression.

29. A hydraulic shock absorber for damping compression of a vehicle suspension which compresses and rebounds, comprising:
a first piston coupled to a rod and slidably received within a first cylinder, said first piston and said first cylinder defining a first variable hydraulic volume that reduces in size during compression of the suspension, at least one of said first piston or said first cylinder defining a first flowpath for fluid during compression of the suspension;
a second piston slidably received within a second cylinder, said second piston and said second cylinder defining a second variable hydraulic volume that reduces in size during compression of the suspension, at least one of said second piston or said second cylinder defining at least part of a second flowpath for fluid flowing out of said second variable volume during compression of the suspension; and
means for externally adjusting the flow characteristics of said second flowpath;
wherein said means for externally adiustinq is a first means, and which further comprises second means for externally adiustinci said second flowpath, said first means being independently adiustable relative to said second means.

30. The shock absorber of claim 29 wherein said first flowpath has a first forcing characteristic which resists compression of the vehicle suspension, said second flowpath has a second forcing characteristic which resists compression of the vehicle suspension, and second characteristic applies greater force to the suspension than the first characteristic.

31. The shock absorber of claim 29 wherein said first piston has a maximum stroke length within said first cylinder from full rebound to full compression, and fluid exits the second variable volume only during the portion of stroke proximate to full compression.

32. The shock absorber of claim 29 wherein said means for adjustment adjusts a fixed flow area of a portion of said second flowpath.

33. The shock absorber of claim 29 wherein said second flowpath includes a projection receivable within an orifice, and said means for adjustment changes the positional relationship of said projection relative to the orifice.

34. The shock absorber of claim 29 wherein second piston includes the second flowpath, and the second flowpath includes a one-way valve adapted and configured to restrict flow from flowing out of the second hydraulic volume.

35. The shock absorber of claim 29 wherein said second cylinder is received within said first variable volume.

36. The shock absorber of claim 29 wherein the second flowpath is from said second variable volume to said first variable volume.

37. The shock absorber of claim 29 wherein said rod has an end, and the end of said rod is not attached to said second piston.

38. The shock absorber of claim 29 wherein said second piston includes an orifice providing fluid communication between said second variable volume and said first variable volume, said first means fixes a flow area, and said second means includes a metering member received with the orifice.

39. The shock absorber of claim 29 wherein said second piston includes an orifice providing fluid communication between said second variable volume and said first variable volume, and which further comprises a metering member received with the orifice.

40. The shock absorber of claim 29 wherein the position of the metering member is adjustable relative to said second cylinder.

41. The shock absorber of claim 29 wherein said second piston is captured within said second cylinder and which further comprises a spring for biasing said second piston relative to said second cylinder.

42. A hydraulic shock absorber for damping compression of a vehicle suspension, comprising:
 a first piston coupled to a rod and slidably received within a first cylinder, said first piston and said first cylinder defining a first variable hydraulic volume that reduces in size during compression of the suspension; and
 a second piston slidably received and captured within a second cylinder, said second piston and said second cylinder defining a second variable hydraulic volume that reduces in size during compression of the suspension with fluid exiting the second variable volume flowing along a second flowpath; and
 an externally adjustable member for varying the flow characteristics of fluid exiting the second variable volume;
 wherein said first piston has a maximum stroke length within said first cylinder from full rebound to full compression, and fluid exits the second variable volume only during the portion of stroke proximate to full compression;
 wherein said second cylinder is attached to said first cylinder;
 wherein said second piston includes a hydraulic fluid metering orifice, said adjustable member comprises a metering needle, wherein said needle is received within said orifice during compression.

43. The shock absorber of claim 42 which further comprises a spring, said spring biasing said second piston relative to said second cylinder.

44. The shock absorber of claim 42 wherein said first variable volume has a first maximum size, said second variable volume has a second maximum size, and the first maximum size is greater than the second maximum size.

45. The shock absorber of claim 42 wherein said first cylinder has a first inner diameter, said second cylinder has a second inner diameter, and the first inner diameter is greater than the second inner diameter.

46. The shock absorber of claim 42 which further includes a resilient seal, said seal sealing said second piston within said second cylinder.

47. The shock absorber of claim 42 wherein said second piston includes a one-way valve.

48. The shock absorber of claim 42 wherein said rod includes an internal passage which provides fluid communication between said first volume and a third variable fluid volume defined by said first piston and said first cylinder.

49. The shock absorber of claim 42 wherein said needle is tapered to reduce the flow area of said orifice as the suspension compresses.

50. The shock absorber of claim 42 wherein said second piston includes a plurality of parallel flowpaths providing fluid communication from the second hydraulic volume to the first hydraulic volume.

51. The shock absorber of claim 42 wherein said shock absorber includes an orifice, and wherein adjustment of said externally adjustable member changes a flow area of the orifice.

52. A hydraulic shock absorber for damping compression of a vehicle suspension which compresses and rebounds, comprising:
 a first piston coupled to a rod and slidably received within a first cylinder, said first piston and said first cylinder defining a first variable hydraulic volume that reduces in size during compression of the suspension, at least one of said first piston or said first cylinder defining a first flowpath for fluid during compression of the suspension;
 a second piston slidably received within a second cylinder, said second piston and said second cylinder defining a second variable hydraulic volume that reduces in size during compression of the suspension, at least one of said second piston or said second cylinder defining at least part of a second flowpath for fluid flowing out of said second variable volume during compression of the suspension; and
 means for externally adjusting the flow characteristics of said second flowpath;
 wherein said second piston includes an orifice providing fluid communication between said second variable volume and said first variable volume, and which further comprises a metering member received with the orifice.

53. The shock absorber of claim 52 wherein said first flowpath has a first forcing characteristic which resists compression of the vehicle suspension, said second flowpath has a second forcing characteristic which resists compression of the vehicle suspension, and second characteristic applies greater force to the suspension than the first characteristic.

54. The shock absorber of claim 52 wherein said first piston has a maximum stroke length within said first cylinder from full rebound to full compression, and fluid exits the second variable volume only during the portion of stroke proximate to full compression.

55. The shock absorber of claim 52 wherein said means for adjustment adjusts a fixed flow area of a portion of said second flowpath.

56. The shock absorber of claim 52 wherein said second flowpath includes a projection receivable within an orifice, and said means for adjustment changes the positional relationship of said projection relative to the orifice.

57. The shock absorber of claim 52 wherein said second cylinder is received within said first variable volume.

58. The shock absorber of claim 52 wherein the second flowpath is from said second variable volume to said first variable volume.

59. The shock absorber of claim 52 wherein said rod has an end, and the end of said rod is not attached to said second piston.

60. The shock absorber of claim 52 wherein said second piston is captured within said second cylinder and which further comprises a spring for biasing said second piston relative to said second cylinder.

* * * * *

UNITED STATES PATENT AND TRADEMARK OFFICE
CERTIFICATE OF CORRECTION

PATENT NO. : 8,162,112 B2  Page 1 of 1
APPLICATION NO. : 12/029112
DATED : April 24, 2012
INVENTOR(S) : Bill J. Gartner et al.

It is certified that error appears in the above-identified patent and that said Letters Patent is hereby corrected as shown below:

On the title page, item [73] Assignee should be as follows:

--Competition Tire East, d/b/a Custom Axis, Reading, PA (US)--.

In claim 29, col. 14, line 53, delete "adiustinci" and insert in lieu thereof --adjusting--.

Signed and Sealed this
Eighteenth Day of December, 2012

David J. Kappos
*Director of the United States Patent and Trademark Office*